(12) United States Patent
Bethani

(10) Patent No.: US 8,349,070 B2
(45) Date of Patent: *Jan. 8, 2013

(54) PYROPROCESSED AGGREGATES COMPRISING IBA AND LOW CALCIUM SILICOALUMINOUS MATERIALS AND METHODS FOR PRODUCING SUCH AGGREGATES

(75) Inventor: Sophia Bethani, Athens (GR)

(73) Assignee: Alkemy, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,866

(22) Filed: Aug. 23, 2010

(65) Prior Publication Data

US 2010/0319581 A1    Dec. 23, 2010

Related U.S. Application Data

(63) Continuation of application No. 11/238,767, filed on Sep. 28, 2005, now Pat. No. 7,780,781.

(30) Foreign Application Priority Data

Jan. 14, 2005  (GR) .............................. 20050100015
Sep. 16, 2005  (GR) .............................. 20050100469

(51) Int. Cl.
*C04B 14/00* (2006.01)
*C04B 18/06* (2006.01)
*B28B 3/00* (2006.01)

(52) U.S. Cl. .................... 106/705; 264/333; 264/DIG. 1
(58) Field of Classification Search .................. 106/705; 264/333, DIG. 1
See application file for complete search history.

(56) References Cited

U.S. PATENT DOCUMENTS

| | | | |
|---|---|---|---|
| 1,895,159 A | | 1/1933 | Greenawalt |
| 2,946,112 A | * | 7/1960 | Tucker, Jr. et al. .......... 156/89.11 |
| 2,948,948 A | * | 8/1960 | Duplin, Jr. et al. ............. 264/43 |
| 3,030,222 A | | 4/1962 | Eichenlaub |
| 3,374,101 A | | 3/1968 | Ban et al. |
| 3,573,940 A | | 4/1971 | Cockrell et al. |
| 3,600,476 A | | 8/1971 | Suzuki et al. |
| 3,679,445 A | * | 7/1972 | Howe ........................... 106/646 |

(Continued)

FOREIGN PATENT DOCUMENTS

CN   1227207 A   9/1999

(Continued)

OTHER PUBLICATIONS

Ries, J.P. and Holm, T.A., "A Holistic Approach to Sustainability for the Concrete Community—Lightweight Concrete-Two Millennia of Proven Performance", Information Sheet 7700.1, Apr. 2004, ESCSI, Salt Lake City, Utah.

(Continued)

*Primary Examiner* — Patricia L Hailey

(57) ABSTRACT

In accordance with an embodiment, a method for producing an aggregate is disclosed comprising mixing IBA and a second, silicoaluminous material having a calcium content less than the IBA. The method further comprises agglomerating the mixture, such as by pelletizing, and pyroprocessing the agglomerates, such as by sintering or vitrification, to form the aggregate. The second material may be a clay, such as bentonite or kaolin, a mining waste, such as granite sawing residues, waste glass, or furnace bottom ash, for example. The addition of the second material has been found to facilitate production of lightweight and normal weight aggregates. Preferably, the IBA or the mixture of IBA and the second material are wet milled prior to agglomeration. Methods for producing expanded aggregates are also disclosed.

26 Claims, 10 Drawing Sheets

U.S. PATENT DOCUMENTS

| | | | |
|---|---|---|---|
| 3,846,366 A | 11/1974 | Wallace | |
| 3,877,920 A | 4/1975 | Carlberg | |
| 3,954,390 A | 5/1976 | Akhundov et al. | |
| 3,961,973 A * | 6/1976 | Jones | 106/679 |
| 3,973,973 A | 8/1976 | Leach | |
| 4,028,130 A | 6/1977 | Webster et al. | |
| 4,038,025 A | 7/1977 | Kratochvil | |
| 4,057,605 A | 11/1977 | Chauvin | |
| 4,081,285 A | 3/1978 | Pennell | |
| 4,120,735 A | 10/1978 | Smith | |
| 4,168,951 A | 9/1979 | Drugge | |
| 4,198,224 A | 4/1980 | Kirkpatrick | |
| 4,226,630 A | 10/1980 | Styron | |
| 4,255,131 A | 3/1981 | Johnson, Jr. | |
| 4,274,825 A | 6/1981 | North | |
| 4,289,479 A | 9/1981 | Johnson, Jr. | |
| 4,342,554 A | 8/1982 | Rohrbach | |
| 4,343,751 A | 8/1982 | Kumar | |
| 4,356,030 A | 10/1982 | Halpin et al. | |
| 4,377,414 A | 3/1983 | Buschmann et al. | |
| 4,432,666 A | 2/1984 | Frey et al. | |
| 4,624,711 A | 11/1986 | Styron | |
| 4,741,782 A | 5/1988 | Styron | |
| 4,770,831 A | 9/1988 | Walker | |
| 4,780,144 A | 10/1988 | Loggers | |
| 4,781,842 A | 11/1988 | Nicholson | |
| 4,781,944 A | 11/1988 | Jones | |
| 4,804,147 A | 2/1989 | Hooper | |
| 4,874,153 A | 10/1989 | Hashimoto et al. | |
| 4,882,067 A | 11/1989 | Johnson et al. | |
| 4,902,431 A | 2/1990 | Nicholson et al. | |
| 4,943,233 A * | 7/1990 | Diaz | 432/13 |
| 4,984,983 A | 1/1991 | Enkegaard | |
| 4,993,331 A | 2/1991 | White et al. | |
| 5,018,459 A | 5/1991 | Judd | |
| 5,057,009 A | 10/1991 | Nechvatal et al. | |
| 5,175,134 A | 12/1992 | Kaneko et al. | |
| 5,196,620 A | 3/1993 | Gustin et al. | |
| 5,246,599 A | 9/1993 | Aicher | |
| 5,265,545 A | 11/1993 | Milner | |
| 5,268,028 A * | 12/1993 | Fifield | 106/726 |
| 5,268,131 A | 12/1993 | Harrison | |
| 5,277,826 A | 1/1994 | Burns et al. | |
| 5,342,442 A | 8/1994 | Nechvatal et al. | |
| RE34,775 E | 11/1994 | Nechvatal et al. | |
| 5,362,319 A * | 11/1994 | Johnson | 106/705 |
| 5,410,973 A * | 5/1995 | Kunstler et al. | 110/246 |
| 5,482,458 A | 1/1996 | Kyffin | |
| 5,500,044 A | 3/1996 | Meade et al. | |
| RE35,219 E | 4/1996 | Kent | |
| 5,521,132 A | 5/1996 | Talmy et al. | |
| 5,583,079 A | 12/1996 | Golitz et al. | |
| 5,595,480 A | 1/1997 | Wang | |
| 5,669,969 A | 9/1997 | Meade et al. | |
| 5,678,235 A | 10/1997 | Crowe | |
| 5,704,972 A | 1/1998 | Ivkovich | |
| 5,772,751 A * | 6/1998 | Nisnevich et al. | 106/679 |
| 5,772,937 A | 6/1998 | Cohen et al. | |
| 5,797,496 A | 8/1998 | Kirchen et al. | |
| 5,935,885 A | 8/1999 | Hnat et al. | |
| 6,084,146 A | 7/2000 | Barkatt et al. | |
| 6,105,517 A | 8/2000 | Swithenbank | |
| 6,183,242 B1 | 2/2001 | Heian | |
| 6,288,300 B1 | 9/2001 | Lemus et al. | |
| 6,342,461 B1 | 1/2002 | Lee et al. | |
| 6,440,884 B1 | 8/2002 | Devagnanam | |
| 6,468,074 B1 | 10/2002 | Wu | |
| 6,528,547 B2 * | 3/2003 | Shulman | 521/54 |
| 6,627,083 B2 | 9/2003 | Rennesund et al. | |
| 6,755,905 B2 | 6/2004 | Oates et al. | |
| 6,818,055 B2 | 11/2004 | Schelinski | |
| 6,887,389 B2 | 5/2005 | Judd | |
| 7,655,088 B2 * | 2/2010 | Bethani | 106/705 |
| 7,704,317 B2 | 4/2010 | Bethani | |
| 7,780,781 B2 * | 8/2010 | Bethani | 106/705 |
| 8,206,504 B2 | 6/2012 | Bethani | |
| 2003/0047114 A1 | 3/2003 | Kayali et al. | |
| 2003/0148879 A1 | 8/2003 | Beaumont et al. | |
| 2004/0217505 A1 | 11/2004 | Singh | |
| 2005/0130828 A1 | 6/2005 | Ohono et al. | |
| 2006/0162618 A1 | 7/2006 | Bethani | |
| 2006/0213397 A1 | 9/2006 | Bethani | |

FOREIGN PATENT DOCUMENTS

| | | |
|---|---|---|
| CN | 1385254 A | 12/2002 |
| DE | 3908172 | 9/1990 |
| DE | 4006826 | 9/1991 |
| EP | 0 034 389 A1 | 8/1981 |
| EP | 0 402 746 A1 | 12/1990 |
| EP | 0 451 815 A1 | 10/1991 |
| EP | 0 496 148 A2 | 7/1992 |
| GB | 942620 B1 | 11/1963 |
| GB | 1396205 | 6/1975 |
| GB | 2189250 A * | 10/1987 |
| GB | 2 218 412 A | 11/1989 |
| GB | 2 273 095 A | 8/1994 |
| GB | 2 292 940 A | 3/1996 |
| JP | 56-030380 | 2/1983 |
| JP | 58-161965 | 9/1983 |
| JP | 8-12413 A | 1/1996 |
| JP | 08-301641 | 11/1996 |
| JP | 9-30857 A1 | 2/1997 |
| JP | 9-156998 A1 | 6/1997 |
| JP | 11035356 | 2/1999 |
| JP | 11035358 | 2/1999 |
| JP | 2001146444 | 5/2001 |
| JP | 2001-253740 | 9/2001 |
| JP | 2002-003248 | 1/2002 |
| JP | 2002274902 | 9/2002 |
| JP | 2002-047074 | 12/2002 |
| JP | 2004-292198 | 10/2004 |
| JP | 2005126282 | 5/2005 |
| KR | 10-0562169 | 3/2006 |
| WO | WO 97/09283 | 3/1997 |
| WO | WO 03/059820 A1 | 7/2003 |
| WO | WO 2006074944 A1 * | 7/2006 |
| WO | WO 2006074946 A2 * | 7/2006 |

OTHER PUBLICATIONS

Huang, W. and Chu, S., "A Study on the Cementlike Properties of Municipal Waste Incineration Ashes", Cement and Concrete Research, vol. 33, pp. 1795-1799, Elsevier Ltd., Oxford, U.K. 2003.

Barbieri, L.; Corradi, A.; and Lancellotti, I., "Bulk and Sintered Glass-Ceramics by Recycling Municipal Incinerator Bottom Ash", Journal of the European Ceramic Society, vol. 20, 2000, pp. 1637-1643, Elsevier Science Ltd., Oxford, U.K.

Cheeseman, C.R.; Monteiro Da Rocha, S.; Sollars, C.; Bethanis, S.; and Boccaccini, A.R., "Ceramic Processing of Incinerator Bottom Ash", Waste Management 23 (2003), pp. 907-916, Elsevier Ltd., Oxford, U.K.

Forteza, R.; Far, M.; Segui, C.; and Cerda, V., "Characterization of Bottom Ash in Municipal Solid Waste Incinerators for Its Use in Road Base", Waste Management 24 (2004), pp. 899-909, Elsevier Lts., Oxford, U.K.

Souza, G.P.; Filgueira, M.; Rosenthal, R. et al., "Characterization of natural diatomaceous composite material", Ceramica, Jan./Mar. 2003,, vol. 49, No. 309, pp. 40-43, Sao Paulo, Brazil. (with English Language Abstract).

Santos, R.S.; Souza, G.P.; and Holanda, J.N.F., "Characterization of Waste of Petroleum Industry Containing Clayey Masses and Its Application in Structural Ceramics", Ceramica, Jul./Sep. 2000 vol. 48 No. 307, pp. 115-120, Sao Paulo, Brazil. (with English Language Abstract).

Derman, J.D.; Schlieper, H.A., "Decontamination and Beneficial Reuse of Dredged Material Using Existing Infrastructure for the Manufacture of Lightweight Aggregate", Presented at 19th Western Dredging Association (WEDA XIX) Annual Meeting and Conference and 31st Texas A&M University Dredging Seminar (TAMU 31), May 15-20, 1999, Louisville, Kentucky.

Barbieri, Luisa, et al., "Design, Obtainment and Properties of Glasses and Glass-Ceramics From Coal Fly Ash", Fuel, 1999, vol. 78, pp. 271-276, Elsevier Science Ltd., Oxford, U.K.

Ghosh, S.; Das, Mihir; Chakrabarti, S.and Ghatak, S., "Development of Ceramic Tiles from Common Clay and Blast Furnace Slag", Ceramics International, 2002, vol. 28, pp. 393-400, Elsevier Science Ltd., Oxford, U.K.

Cheng, T.W., "Effect of Additional Materials on the Properties of Glass-Ceramic Produced From Incinerator Fly Ashes", Chemosphere, vol. 56, 2004, pp. 127-131, Elsevier Ltd., Oxford, U.K.

Pinto, M.F.; Sousa, S.J.G.; and Holanda, J.N.F., "Effect of Firing Cycle on the Technological Properties of a Red Wall Tile Paste", Ceramica, Jul./Sep. 2005, vol. 51, No. 319, pp. 225-229, Sao Paulo, Brazil. (with English Language Abstract).

Bethanis, B.; Cheeseman, C.and Sollars, C., "Effect of Sintering Temperature on the Properties and Leaching of Incinerator Bottom Ash", Waste Management & Research, vol. 22, 2004, pp. 255-264, International Solid Waste Association, U.K.

Dana, K.; Das, S.and Das, S.K., "Effect of Substitution of Fly Ash for Quartz in Triaxial Kaolin-Quartz-Feldspar System", Journal of the European Ceramic Society, 2004, vol. 24, pp. 3169-3175, Elsevier Ltd., Oxford, U.K.

Basegio, T.; Berutti, F.; Bernardes, A. and Bergmann, C.P., "Environmental and Technical Aspects of the Utilisation of Tannery Sludge as a Raw Material for Clay Products", Journal of the European Ceramic Society, 2002, vol. 22, pp. 2251-2259, Elsevier Science Ltd., Oxford, U.K.

Sousa, S.J.G.; and Holanda, J.N.F., "Evaluation of Physical-Mechanical Properties of a Ceramic Paste for Porous Wall Tile (BIII)", Ceramica, Jan./Mar. 2005, vol. 51 No. 317, pp. 70-76, Sao Paulo, Brazil. (with English Language Abstract).

"Furnace Bottom Ash (FBA) in Light Weight Aggregate (LWA) Concrete Blocks", Technical Data Sheet, http://www.ukqaa.org.uk/Datasheets_PDF/Datasheet_7-0_Aug_2004.pdf, Aug. 2004, United Kingdom Quality Ash Association, U.K.

"Incinerator Bottom Ash", http://web.archive.org/web/20050315073113/http://www.hanson.co.uk/Products-Services/Aggregates/Recycled/iba/, Hanson, U.K. (at least as early as Jul. 15, 2005).

Bethanis, S., "Incorporation of Starch in Waste Ashes and its Impact on Porosity Formation of Ceramics", Proceedings of the 20th International Conference on Solid Waste Technology and Management, Apr. 3-6, 2005, Philadelphia, PA.

"Lightweight Aggregate", from Identification and Description of Mineral Processing Sectors and Waste Streams, Environmental Protection Agency, U.S., 1995. Available at http://www.epa.gov/epaoswer/other/mining/minedock/id/id4-lwa.pdf.

"Lightweight Aggregates Manufactured from Pulverised Fuel Ash", http://www.ukqaa.org.uk/Datasheets_PDF/Datasheet_4-0_Aug_2003.pdf, Aug. 2004, U.K.

"Lightweight Aggregate Plant", http://www.r-s.com/projects/96WD10.htm, Roberts & Schaefer Company, Illinois, 2000, U.S.

Bethanis, S.; Cheeseman, C.R., "Manufacture of Lightweight Aggregate from Incinerator Bottom Ash and Pulverised Fuel Ash", Proceedings of the Heleco Conference, Feb. 3-6, 2005, Athens, Greece.

Bijen, J.M., "Manufacturing Processes of Artificial Lightweight Aggregates from Fly Ash", The International Journal of Cement Composites and Lightweight Concrete, Aug. 1986, vol. 8, No. 3, pp. 191-199, U.K.

Hernandez-Crespo, M.S.; and J. MA. Rincon, "New Porcelainized Stoneware Materials Obtained by Recycling of MSW Incinerator Fly Ashes and Granite Sawing Residues.", Ceramics International, 2001, vol. 27, pp. 713-720, Elsevier Science Ltd., Oxford, U.K.

Zakaria, M.; and Cabrera, J.G., "Performance and Durability of Concrete Made With Demolition Waste and Artificial Fly Ash-Clay Aggregates", Waste Management, 1996, vol. 16, Nos. 1-3, pp. 151-158, Elsevier Science Ltd., Oxford, U.K.

Bethanis, S., "Production of Synthetic Aggregates from Waste Ashes", Proceedings of the 20th International Conference on Solid Waste Technology and Management, Apr. 3-6, 2005, Philadelphia, PA.

Bethanis, S.; Cheeseman C.R.; and Sollars, C.J., "Properties and Microstructure of Sintered Incinerator Bottom Ash", Ceramics International, 2002, vol. 28, pp. 881-886, Elsevier Science Ltd., Oxford, U.K.

Cheeseman, C.R.; Makinde, A.; and Bethanis, S, "Properties of Lightweight Aggregate Produced by Rapid Sintering of Incinerator Bottom Ash", Resources, Conservation, and Recycling, vol. 43, 2004, pp. 147-162, Elsevier Ltd., Oxford, U.K.

Bai, Y.; Ibrahim, R.; and Basheer, P.A., "Properties of Lightweight Concrete Manufactured With Fly Ash, Furnace Bottom Ash, and Lytag", International Workshop on Sustainable Development and Concrete Technology, May 20-21, 2004, Beijing, China.

Kuennen, T., "Synthetic Aggregates Promise New Options for Engineers", Better Roads, Jun. 2005, http://obr.gcnpublishing.com/articles/jun05e.htm, James Informational Media Inc., Illinois, U.S.

Swamy, R.N.; and Lambert, G.H., "The Microstructure of Lytag Aggregate", The International Journal of Cement Composites and Lightweight Concrete, Nov. 1981, vol. 3, No. 4, pp. 273-282, Construction Press, England.

Wang, K.-S.; Tsai, C.-C.; Lin, K.-L.; and Chiang, K.Y., "The Recycling of MSW Incinerator Bottom Ash by Sintering" Waste Management & Research, vol. 21, 2003, pp. 318-329, International Solid Waste Association, Denmark.

"The Use of Incinerator Bottom Ash as Aggregate" Aggregates Advisory Service, Mar. 1999, Digest No. 065, Energy from Waste Association, Department of the Environment, London, England.

Schroeder, R.L., "The Use of Recycled Materials in Highway Construction", Public Roads, vol. 58, Autumn 1994, Federal Highway Administration, Washington D.C., U.S.

Menezes, R.R. et al., "Use of Granite Sawing Wastes in the Production of Ceramic Bricks and Tiles", Journal of the European Ceramic Society, vol. 25, May 2005, pp. 1149-1158, Elsevier Ltd., Oxford, U.K.

Barbieri, L.; Corradi, A.; Lancellotti, I.; and Manfredini, T., "Use of Municipal Incinerator Bottom Ash as Sintering Promoter in Industrial Ceramics", Waste Management, 2002, vol. 22, pp. 859-863, Elsevier Science Ltd., Oxford, U.K.

"Use of Recycled Materials and Industrial By-Products in Concrete" http://www.greenconcrete.dundee.ac.uk/ProjectOverview.htm, Jan. 2, 2005, University of Dundee, Scotland, U.K.

Segadaes, A.M.; Carvalho, M.A.; and Acchar, W., "Using Marble and Granite Rejects to Enhance the Processing of Clay Products", Applied Clay Science, 2005, pp. 42-52, Elsevier B.V., Oxford, U.K.

Baykal, G.; and Doven A.G., "Utilization of Fly Ash by Pelletization Process; Theory, Application Areas and Research Results", Resources, Conservation and Recycling, vol. 30, 2000, pp. 59-77, Elsevier Science Ltd., Oxford, U.K.

Moreira, J.M.S.; Freire, M.N.; and Holanda, J.N.F., "Utilization of Granite Sawing Waste from Espirito Santo State in Red Ceramic", Ceramica, Oct./Dec. 2003, pp. 262-267, vol. 49, No. 312, Sao Paulo, Brazil. (with English Language Abstract).

"Utilization of Lightweight Aggregates Made from Coal Gasification Slags", http://www.icci.org/99final/choudhry.htm, Illinois Clean Coal Institute, 1999, Illinois, U.S.

"Utilization of Lightweight Materials Made from Coal Gasification Slags", Quarterly Report No. 2019, http://www.osti.gov/bridge/servlets/purl/758161-Id7qbW/webviewable/758161.PDF, Sep. 1999, U.S. Department of Energy—Office of Fossil Energy, West Virginia, U.S.

Moreira, J.M.S.; Manhaes, J.P.V.T.; and Holanda, J.N.F., "Utilization of Ornamental Rock Waste from Northwest Fluminese in Red Ceramic", Ceramica, vol. 51, No. 319, Jul./Sep. 2005, pp. 180-186, Sao Paulo, Brazil. (with English Language Abstract).

Oliveira, G.E.; and Holanda, J.N.F., "Utilization of Solid Waste from Siderurgical Industry in Red Ceramic", Ceramica, Apr./Jun. 2004, pp. 75-80, vol. 50, No. 314, Sao Paulo, Brazil. (with English Language Abstract).

Manfred, K, "Vitrification of Waste Materials", Glass Science and Technology, vol. 70, Dec. 1997, pp. 375-381, Würzburg, Germany.

Bethanis, S.; and Cheeseman C.R., "Production of Lightweight Aggregate from Incinerator Bottom Ash and Pulverised Fuel Ash", Waste Management and the Environment II 2004, 2004, pp. 55-64, XP 008053699.

Abstract of Korean Patent for KR 2003 071 419 A (Lee M S) Sep. 3, 2003; Database WPI Section Ch., Week 200405 Derwent Publications Ltd., London, GB; AN 2004-049377 XP 002376996.

Abstract of Korean Patent for KR 2002 078 079 A (Tan Co., Ltd.) Oct. 18, 2002; Database WPI Section Ch., Week 200326 Derwent Publications Ltd., London, GB; AN 2003-264145 XP002376995.

Abstract of Japan for JP 08 239254 A (Chichibu Onoda Cement Corp) Sep. 17, 1996; Patent Abstracts of Japan vol. 1997, No. 01, Jan. 31, 1997.

Wainwright, P.J., "Artificial Aggregate From Domestic Refuse", Concrete, May 1981, pp. 25-29, 15(5), U.K.

Show, K.Y., Lee, D.J., Tay, J.H., Hong, S.Y., and Chien, C.Y., "Lightweight Aggregates from Industrial Sludge-Marine Clay Mixes." Journal of Environmental Engineering, vol. 131, No. 7, Jul. 2005, pp. 1106-1113, International Solid Waste Association, Denmark.

Cheeseman, C.R.; and Virdi, G.S., "Properties and Microstructure of Lightweight Aggregate Produced from Sintered Sewage Sludge Ash", Resources, Conservation, and Recycling, vol. 45, 2005, pp. 18-30, Elsevier Ltd., Oxford, U.K.

Tay, J.H.; and Show, K. Y., "Resource Recovery of Sludge as a Building and Construction Material—A Future Trend in Sludge Management", Water Science and Technology, vol. 36, No. 11, 1997, pp. 259-266, Elsevier Science Ltd., Oxford, U.K.

Wainwright, P.J.; and Cresswell, D.J.F., "Synthetic Aggregates From Combustion Ashes Using an Innovative Rotary Kiln", Waste Management, vol. 21, 2001, pp. 241-246, Elsevier Science Ltd., Oxford, U.K.

Wiebusch, B.; and Seyfried, C.F., "Utilization of Sewage Sludge Ashes in the Brick and Tile Industry", Water Science and Technology, vol. 36, No. 11, 1997, pp. 251-258, Elsevier Science Ltd., Oxford, U.K.

Email dated Jul. 15, 2005 from Marika D. Fox of the Imperial College Library to the inventor, providing a Circulation Summary Record showing a "date created" field with the date of Jan. 11, 2004 (Nov. 1, 2004, in European style).

Email dated Aug. 26, 2008 from Ben Whelehan, Help Desk of the Imperial College library (email address "Library Help <libhelp@imperial.ac.uk>"), to the inventor stating that the "section 'date created'" refers to the date the thesis was entered on the library catalogue.

Email dated Sep. 4, 2008 from Ruihua Zhang, also of the Imperial College, to the inventor stating that "the Ph.D. thesis became available to the public since Nov. 30, 2004 (14:13 discharged from Processing, Stock Management), located in the Central Library Imperial College."

Bethani, Sophia; Thesis "Production of Lightweight Aggregates From "Energy From Waste" Combustion Ashes"; Department of Civil and Environmental Engineering, Imperial College of Science, Technology and Medicine, London, Nov. 2004.

Abstracts of JP 08-012413 (EBARA Corp; others 02) Jan. 16, 1996, Patent Abstract of Japan vol. 1996, No. 05, May 31, 1996.

Abstract of JP 08-301641 (Sumitomo Metal Mining Co Ltd) Nov. 19, 1996.

Abstract of JP 10-087357 (UBE IND ltd) Apr. 7, 1998, Patent Abstract of Japan vol. 1998, No. 09, Jul. 31, 1998.

Abstract of JP 2004-269289 (Sumitomo Metal Mining Co Ltd) Sep. 30, 2004, Patent Abstract of Japan vol. 2003, No. 12, Dec. 5, 2003.

Office Action dated Jan. 9, 2009 from U.S. Appl. No. 11/332,459.

Office Action dated Jul. 16, 2009 from U.S. Appl. No. 11/332,459.

Notice of Allowance dated Oct. 13, 2009 from U.S. Appl. No. 11/332,459.

Office Action dated Oct. 13, 2010 from U.S. Appl. No. 12/658,079.

Office Action dated Jun. 27, 2011 from U.S. Appl. No. 12/658,079.

Notice of Allowance dated Jan. 25, 2012 from U.S. Appl. No. 12/658,079.

Office Action dated Oct. 2, 2008 from U.S. Appl. No. 11/238,758.

Office Action dated May 28, 2009 from U.S. Appl. No. 11/238,758.

Notice of Allowance dated Dec. 24, 2009 from U.S. Appl. No. 11/238,758.

International Preliminary Report on Patentability from PCT/EP2006/000271 dated Aug. 13, 2007.

International Search Report and Written Opinion of the International Searching Authority from PCT/EP2006/000271 dated Aug. 11, 2006.

English Translation Chinese Office Action dated Dec. 26, 2008 from Application No. 200680007990.5.

Chinese Office Action with English Translation dated Jul. 27, 2010 from Application No. 200680007990.5.

Chinese Office Action with English Translation dated Nov. 23, 2011 from Application No. 200680007990.5.

English Translation of Chinese Office Action dated Dec. 26, 2008 from Application No. 200680007989.2.

Chinese Office Action with English Translation dated Jul. 27, 2010 from Application No. 200680007989.2.

Chinese Office Action with English Translation dated Dec. 26, 2011 from Application No. 200680007989.2.

Japanese Office Action with English Translation dated Sep. 20, 2011 from Application No. 2007-550763.

Japanese Office Action with English Translation dated Sep. 6, 2011 from Application No. 2007-550762.

Database WPI Section CH, Week 198819 Derwent Publication Ltd., London, GB; AN 1982-27042E XP002348463 & JP 63 017791 B (Nitsubishi Heavy Ind KK) Apr. 15, 1988.

Database WPI Section CH, Week 200381 Derwent Publication Ltd., London, GB; AN 2003-873723 XP002348464 & KR 2003 061 177 A (Jo B W) Jul. 18, 2003.

Dialog Abstract for JP 10 029841 A (Sumitomo Metal Mining Co Ltd), Feb. 3, 1998.

Office Action dated Mar. 21, 2008 from U.S. Appl. No. 11/332,459.

De Casa, G., Mangialardi, T., and Piga, L., "Production of Artificial Aggregates From Ceramic Processing of Municipal Incinerator Fly Ash", Waste Management and the Environment II, 2004, pp. 45-54, WIT Press, U.K.

* cited by examiner

PYROPROCESSED AGGREGATES COMPRISING IBA AND LOW CALCIUM SILICOALUMINOUS MATERIALS AND METHODS FOR PRODUCING SUCH AGGREGATES

RELATED APPLICATION

The present application is a continuation of U.S. patent application Ser. No. 11/238,767, which was filed on Sep. 28, 2005, will issue on Aug. 24, 2010 bearing U.S. Pat. No. 7,780,781, is assigned to the assignee of the present invention and is incorporated by reference herein.

FIELD OF THE INVENTION

Pyroprocessed products and processes therefor, and, more particularly, pyroprocessed aggregates comprising incinerator bottom ash from municipal solid waste incinerators ("IBA") and low calcium silicoaluminous materials and processes for making such aggregates. The products may be sintered or vitrified lightweight and normal weight aggregates, for example. Such aggregates may be used in concrete, masonry, or insulation, for example.

BACKGROUND OF THE INVENTION

Aggregates, which are essential ingredients of concrete, may be derived from natural sources with minimal processing or from naturally occurring materials that are heat treated. Aggregates may also be synthetic. Aggregates from natural sources, such as quarries, pits in ground, and riverbeds, for example, are generally composed of rock fragments, gravel, stone, and sand, which may be crushed, washed, and sized for use, as needed. Natural materials that may be used to form aggregates include clay, shale, and slate, which are pyroprocessed, causing expansion of the material. OPTIROC and LECA are examples of commercially available expanded clay aggregates, for example. Synthetic aggregates may comprise industrial byproducts, which may be waste materials. LYTAG, for example, is a commercially available sintered aggregate comprising pulverized fuel ash ("PFA"), also known as fly ash. PFA is produced from the combustion of coal in power plants, for example.

Aggregates may be lightweight or normal weight. Lightweight aggregates ("LWAs") have a particle density of less than 2.0 $g/cm^3$ or a dry loose bulk density of less than 1.1 $g/cm^3$, as defined in ASTM specification C330. Normal weight aggregates from gravel, sand, and crushed stone, for example, generally have bulk specific gravities of from about 2.4 to about 2.9 (both oven-dry and saturated-surface-dry), and bulk densities of up to about 1.7 $g/cm^3$. High quality LWAs have a strong but low density porous sintered ceramic core of uniform structural strength and a dense, continuous, relatively impermeable surface layer to inhibit water absorption. They are physically stable, durable, and environmentally inert. LWAs should also be nearly spherical, to improve concrete properties and provide good adherence to concrete paste. Suitable sizes for incorporation in concrete are in a range of from about 4.75 mm to about 25 mm, or 2.36 mm to 9.5 mm for coarse aggregates, in accordance with ASTM Specification C330. Smaller, fine aggregates, which are a byproduct of LWA production, may also be used, to replace sand in concrete, for example. For use in concrete, LWAs should have a sufficient crushing strength and resistance to fragmentation so that the resulting concrete has a strength of greater than 10 MPa and a dry density in a range of about 1.5 $g/cm^3$ to about 2.0 $g/cm^3$. Concrete containing LWAs ("LWA concrete") may also have a density as low as about 300 $kg/m^3$.

While LWA concrete may be 20-30% lighter than conventional concrete, it may be just as strong. Even when it is not as strong as conventional concrete, the LWA concrete may have reduced structural dead loads enabling the use of longer spans, narrower cross-sections, and reduced reinforcement in structures. The lower weight of the LWA concrete facilitates handling and reduces transport, equipment, and manpower costs. LWA concrete may be particularly useful in construction slabs in high rise buildings and in concrete arch bridges, for example. LWA concrete may also have improved insulating properties, freeze-thaw performance, fire resistance, and sound reduction. LWAs can also be used in the construction of other structures, in highways, and as soil fillers, for example.

Quarrying is the largest source of aggregates by volume in most countries. Despite the many advantages of LWAs, aggregate extraction is complicated by environmental and legal issues, availability, and transportation and other costs, for example.

Waste disposal is another area presenting significant environmental and legal issues. Due to the exhaustion of available landfill sites, the difficulties in acquiring new sites, the adverse environmental effects, and the costs of landfilling, disposal of waste materials has been a significant problem for many years. For example, incinerator bottom ash ("IBA"), which is a heavy ash stream generated from municipal solid waste ("MSW") incineration, is a significant waste in terms of volume. IBA accounts for about 75% to about 80% of the total weight of MSW incinerator residues. IBA comprises a heterogeneous mixture of slag, glass, ceramics, ferrous and non-ferrous metals, minerals, other non-combustibles, and unburnt organic matter. The considerable amounts of IBA produced present significant disposal problems. When landfilled, heavy metals may leach from the IBA into the ground and underground resources. IBA is currently used in its raw form (without heat treatment) in the construction of fills and embankments, pavement base and road sub-base courses, soil stabilization, landfill cover, in bricks, blocks, and paving stones, and as fillers in particular applications. Although considered a relatively inert waste, leaching of heavy metals in these applications is possible. Concrete containing IBA is weaker than concrete incorporating LYTAG, for example. The IBA may also chemically react with cement, leading to swelling and cracking.

Significant volumes of waste are also produced by electricity-generating coal power plants, mainly in the form of fine-grained particulate material in flue gases from the power plant furnace, which is referred to as pulverized fuel ash ("PFA"). PFA accounts for 70 to 80% of the coal ash produced. As mentioned above, sintered LWAs comprising PFA are commercially available under the tradename LYTAG. ASTM C 618 defines two major classes of PFA, on the basis of their chemical composition, Class F and Class C. Class F PFA, which comprises siliceous and sometimes aluminous material, is normally produced from burning anthracite or bituminous coal and has little or no cementitious value. Class C PFA, which is normally produced from the burning of subbituminous coal and lignite, usually contains significant amount of calcium hydroxide (CaOH) or lime (CaO). Class C PFA has some cementitious properties. The majority of PFA produced is currently disposed in landfills at a great cost and risk of leakage of heavy metals that could contaminate underground aquifers.

In addition to PFA, power plants produce furnace bottom ash ("FBA"), which is a heavier, coarse ash material that falls through the bottom of the furnace. FBA is classified as either wet or dry bottom ash, depending on the type of boiler used. Although both coal combustion by-products have properties that make them desirable for use in a range of applications, more than 70% of the coal ash is unused. The majority of it is disposed of in landfills. FBA is currently used in its raw form as an aggregate in lightweight concrete masonry units, as raw feed material in Portland cement, as a road base and subbase aggregate, as a structural fill material (such as embankments and retaining walls), and as a fine aggregate in asphalt paving.

The mining industry produces significant quantities of waste in the form of powder, mud, and crushed material of different sizes, generated during crushing and washing operations. About 75 percent of these residues contain various types of soft stones such as marble, china, and travertine. The remainder of the residues contain hard stones, such as granite.

Granite sawmills and granite cutting machines used in granite mining, for example, which is one of the most important mining sectors, generate a large amount of granite waste residues in the form of powder or mud from sawing and washing processes. Such waste needs to be treated prior to lagoon or landfill disposal in order to prevent contamination of ground or underground water aquifers. Granite comprises silica and alumina.

Waste glass, which is removed from the MSW stream, is another waste product. Waste glass has been used in highway construction as an aggregate substitute in asphalt paving and as a granular base or fill material. Waste glass varies in sizes from between about 25 mm to about 100 mm.

U.S. Pat. No. 4,120,735 to Smith discloses a method of producing a brick or similarly fired construction unit, such as a ceramic-type tile or vitrified pipe, comprising mixing at least 50% by weight inorganic, non-ferrous residue from municipal incinerators (which generally refers to incinerator bottom ash) with coal fly ash and a binder, such as sodium silicate. The mixture is shaped and then fired in three steps. First, the mixture is heated at 180° C. for one hour, to ensure that moisture in the mixture is evaporated. Then the mixture is heated in increments of 65° C./minute to 550° C. and held overnight, to burn off carbon. Then the mixture is fired at temperatures of from about 1,700° F. (926° C.) to about 2,000° F. (1,093° C.), to form the brick. Smith emphasizes that the addition of the incinerator residue to the coal fly ash lowered the firing temperature as compared to a coal fly ash brick. Smith states that the incinerator residue, instead of the fly ash, melts to produce bonding on cooling. Considerable fusion is said to take place between 1,700° F. (926° C.) and 1,750° C. (954° C.). Smith also reports better brick properties as the proportion of incinerator residues increase. A preferred composition is therefore 50% to 60% incinerator residue 1% to 4% binder, and the remainder coal fly ash. Based on the low firing temperature, it is believed that the incinerator residue comprised predominantly glass and possibly incinerator fly ash. Due to the reported strengths, it is also believed that Smith produced a vitrified brick, with a large glassy, amorphous phase. The brick has high strength and low porosity, as the melted glass components of the incinerator residue filled most pores.

The economic burdens and the risks of waste disposal make it advantageous to develop alternative techniques for converting wastes into revenue-earning products, which would also reduce the demand for less accessible, non-renewable materials.

SUMMARY OF THE INVENTION

The production of synthetic aggregates from incinerator bottom ash from municipal solid waste incinerators ("IBA") would avoid or mitigate some or all of the problems associated with waste disposal of IBA and quarrying for aggregate raw materials. However, it has been found that IBA may be difficult to pyroprocess into a product having desired characteristics, because it sinters and densifies rapidly. IBA contains high concentrations of calcium containing minerals, such as calcium oxides, carbonates, and sulfates, as well as sodium and potassium oxides and sulfates. These minerals act as "fluxes." It is believed that these fluxes lower the melting point of the remaining compounds in the IBA, causing sintering and densification at lower temperatures than if lesser amounts of the fluxes were present. In addition, the composition of IBA is very variable, making its pyroprocessing behavior unpredictable. Variability in IBA composition may be due to several factors, such as the incineration procedures and variability in the wastes received and processed by the MSW incinerator. The wastes received may vary based on the time of the year and the geographic location where the wastes are generated.

In accordance with an embodiment of the invention, a method for producing an aggregate is disclosed comprising mixing incinerator bottom ash ("IBA") from a municipal solid waste incinerator and a second, silicoaluminous material having less calcium than the IBA. The method further comprises agglomerating the mixture to form an agglomerate and pyroprocessing the agglomerate to form an aggregate. The second material may comprise clay, shale, slate, mining waste, waste glass, and/or furnace bottom ash. The clay may comprise bentonite and/or kaolin, for example. The mining waste may comprise granite sawing residues, for example.

The method may further comprise milling the IBA, preferably by wet milling, prior to mixing. The mixture of the IBA and the second material may also be milled, such as by wet milling, prior to agglomerating. The agglomerating may comprise pelletizing. After wet milling, the water may be removed and used during pelletizing and/or quenching of the pyroprocessed aggregate. The agglomerate may have a diameter of from about 3 mm to about 40 mm, for example. The method may further comprise coating the agglomerates with an inorganic powder. The inorganic powder may be PFA, clay, shale, and slate, for example.

The agglomerates are preferably pyroprocessed in a rotary kiln. The aggregate may be pyroprocessed into a lightweight aggregate or a normal weight aggregate. The aggregates may be pyroprocessed to form a sintered or a vitrified aggregate.

The IBA and the second material may be mixed with an organic material, such as activated carbon waste, to increase the porosity of the aggregate. The organic material may comprise up to about 30% by dry weight of the mixture of IBA and the second material, for example.

The method may further comprise controlling selected properties of the aggregate, such as density and water absorption, based, at least in part, on a proportion of the IBA to the second material and the pyroprocessing temperature. The method may further comprise controlling selected properties of the aggregate, such as density, based, at least in part, on the addition of the organic material.

The method may further comprise mixing from about 5% to about 95% IBA by dry weight of the mixture with from about 95% to about 5% of the second material by dry weight of the mixture. Preferably, about 30% to about 70% IBA by dry weight of the mixture is mixed with from about 70% to about 30% of the second material by dry weight of the mixture. More preferably, about 30% to about 50% IBA by dry weight of the mixture is mixed with from about 70% to about 50% of the second material by dry weight of the mixture.

In accordance with another embodiment of the invention, a method for producing a sintered lightweight aggregate is disclosed comprising preparing a mixture comprising IBA and second, silicoaluminous material having less calcium than the IBA, agglomerating the mixture to form an agglomerate, and sintering the agglomerate. The second, silicoaluminous material may comprise the same materials discussed in the embodiment above. The method may further comprise sintering the agglomerate to form an aggregate having a relative density of less than about 2.0 g/cm³. The lightweight aggregate may have a water absorption less than about 40% by dry weight. The agglomerate is preferably sintered in a rotary kiln.

The method may further comprise mixing a predetermined proportion of IBA to the second material and sintering the agglomerate at a temperature based, at least in part, on the predetermined proportion, to form a lightweight aggregate having a predetermined density. Mixing about 40% IBA by dry weight of the mixture with about 60% of the second material by dry weight of the mixture is preferred. This embodiment may include mixtures at the proportions described above, as well. The method may further comprise pyroprocessing the mixture at a temperature in a range of from about 1,050° C. to about 1,170° C. The method of this embodiment may further comprise the other actions described in the first embodiment.

In accordance with another embodiment of the invention, a method for producing an aggregate is disclosed comprising mixing incinerator bottom ash ("IBA") from a municipal solid waste incinerator and a second, non-coal ash silicoaluminous waste material having less calcium than the IBA, agglomerating the mixture to form an agglomerate, and pyroprocessing the agglomerate to form an aggregate. The agglomerate may be pyroprocessed in a rotary kiln. The agglomerate may be pyroprocessed to form a lightweight aggregate having a dry relative density of less than 2 grams per cubic centimeter. The agglomerate may be pyroprocessed to a temperature in a range from about 1050° C. to about 1240° C. The agglomerate may be pyroprocessed to sinter the agglomerate. The agglomerate may be pyroprocessed to expand the agglomerate to form an aggregate comprising pores. The method may comprise mixing from about 30% to about 70% IBA by dry weight of the mixture with from about 70% to about 30% of the second, waste material by dry weight of the mixture.

The second, waste material may comprise mining waste. The method may further comprise reducing the particle size of at least the IBA prior to agglomerating. The method may further comprise mixing the IBA and the second material with an organic material. The method may further comprise controlling one or more selected properties of the aggregate based, at least in part, on a proportion of the IBA to the second, waste material and a pyroprocessing temperature.

In accordance with another embodiment of the invention, a method for producing an aggregate is disclosed comprising preparing a mixture comprising incinerator bottom ash ("IBA") from a municipal solid waste incinerator and a second, non-coal ash silicoaluminous waste material, agglomerating the mixture to form an agglomerate, and pyroprocessing the agglomerate in a rotary kiln to form a lightweight aggregate having a dry relative density of less than 2 grams per cubic centimeter. The method may comprise pyroprocessing the mixture at a temperature in a range of from about 1,050° C. to about 1,240° C. The second, waste material may comprise less calcium than the IBA.

In accordance with another embodiment of the invention, a method for producing an aggregate is disclosed comprising mixing incinerator bottom ash ("IBA") from a municipal solid waste incinerator and a second, non-coal ash silicoaluminous waste material, agglomerating the mixture to form an agglomerate, and pyroprocessing the agglomerate to a temperature to expand the agglomerate to form a lightweight aggregate having pores and a dry relative density of less than 2 grams per cubic centimeter. The method may comprise pyroprocessing the agglomerate to cause volatilization and entrapment of volatized gases. The method may further comprise reducing particle size of at least the IBA prior to agglomerating. The method may further comprise mixing the IBA and the second material with an organic material. The second material may comprise less calcium than the IBA. The agglomerate may be pyroprocessed in a rotary kiln.

Embodiments of the invention may provide substantial economic and environmental benefits by reducing the dependence of IBA and the silicoaluminous waste materials, as well as activated carbon waste, on landfill disposal, and providing an alternative to the depletion of natural resources in the search for aggregate raw materials.

DETAILED DESCRIPTION OF THE PREFERRED EMBODIMENTS

The behaviour of a material when heated is primarily dependent on its composition, grain size, and distribution of minerals. Suitable sintered products can be obtained only if a good ratio between refractory and fluxing minerals exists so that it provides a controlled densification with pyroprocessing temperature. Fluxing minerals lower the melting point of the remaining components in a material. A high amount of alkaline earth metals calcium and magnesium, as well as alkaline metals sodium and potassium, in the form of oxides, carbonates or sulfates present in a material, results in a correspondingly lower fraction of the glass network-forming element silicon. These provide a "fluxing" action to the remaining compounds, promoting sintering and melting at the temperature of the lowest eutectic point of the components in the mixture. IBA, which is used in the production of pyroprocessed aggregates in embodiments of the present invention, contains high amounts of calcium oxides and carbonates, as well as lower amounts of sodium and potassium oxides or sulfates. Sintering and vitrification therefore take place at lower temperatures than those for refractory minerals. In addition, the fluxes, which have low viscosity and high mobility, assist in the formation of a sintered or vitrified product, depending on the temperatures involved, by liquid phase sintering. It has been found that IBA exhibits rapid sintering and densification because of the presence of high concentrations of these fluxes.

In accordance with embodiments of the invention, certain silicoaluminous materials having a calcium content less than that of IBA, are mixed with IBA to improve the densification behavior of IBA with temperature. This has been found to provide better control over the aggregate production process. One type of silicoaluminous material that may be used is clay. An example of a clay that may be used is bentonite, which is a magnesium-aluminum silicate. Another example of a clay that may be used is kaolin, which is a hydrated silica aluminate. Shale, which is a sedimentary rock formed by compression of clay, silt, or mud, is a related example of a silicoaluminous material that may be used. Slate, which is an homogenous sedimentary rock composed of clay or volcanic ash, is another related example of a silicoaluminous material that may be used. Other silicoaluminous materials that may be used include waste materials such as mining wastes, waste glass, and furnace bottom ash ("FBA") Mining wastes include granite sawing residues. FBA is the heavier, coarse ash material that falls through the bottom of the furnace in coal burning power plants. It has the same composition as PFA.

Figure 1:
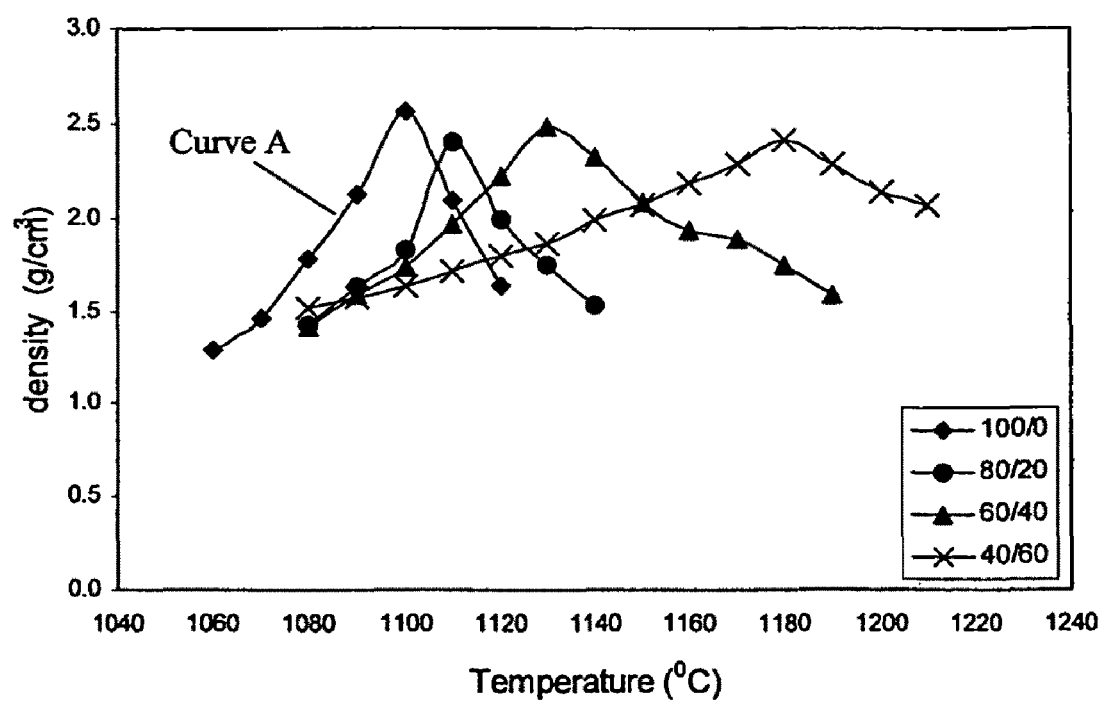
FIG. 1 is a graph of density (g/cm³) versus pyroprocessing temperature (° C.) for IBA and mixtures of IBA and bentonite, in accordance with an embodiment of the invention.

FIG. 1 is a graph of density (g/cm$^3$) versus pyroprocessing temperature (° C.) for aggregates comprising IBA, and aggregates comprising mixtures of IBA and bentonite, over a range of about 1,060° C. to about 1,220° C. Curve A, corresponding to 100% IBA, shows that as temperature increases from about 1,060° C. to about 1,100° C., density increases from a low of about 1.3 g/cm$^3$ to a maximum density of about 2.6 g/cm$^3$. As temperature increases from 1,100° C. to 1,120° C., density decreases from the maximum density of about 2.6 g/cm$^3$ to about 1.6 g/cm$^3$. Aggregates with densities of 2.0 g/cm$^3$ and below are referred to as lightweight aggregates while aggregates with densities above 2.0 g/cm$^3$ are referred to as normal weight aggregates.

Density increases with temperature from 1,060° to 1,100° C. because in this temperature range, as the product sinters, the fluxing agents in the IBA melt to form a liquid phase that fills pores between particles in the IBA by capillary action. Density increases as pores are filled and the volume of the sample decreases. In addition, smaller particles in the liquid phase diffuse toward the larger particles. The melted materials form a rigid, glassy, amorphous skeleton or matrix upon hardening. As the processing temperature increases, more of the compounds in the IBA melt, substantially eliminating all the pores and forming a more glassy, crystalline solid matrix. At the temperature of maximum densification, essentially all of the pores are filled and the product is vitrified.

Density decreases with temperature from 1,100° C. to 1,120° C. because further temperature increases result in sample melting and bloating. Bloating is caused by the entrapment of gases in the melted liquid phase, resulting from volatilization of certain components of the sample. The entrapped gases form pores.

As shown in FIG. 1, IBA sinters rapidly over a very narrow temperature range. For example, in order to produce a sintered lightweight aggregate comprising 100% IBA having a density in a range of about 1.5 g/cm$^3$ to about 1.8 g/cm$^3$, the sintering temperature must be within a range of 1,070° C.-1,080° C., which is only 10° C. wide. In addition, variations in the composition of a given sample of IBA cause significant variations in the behavior of different IBA samples during heating. The relationship between temperature and density for different IBA samples may therefore vary widely. Consequently, it is very difficult to achieve an IBA end product having desired characteristics of density, porosity, water absorption, etc. The inability to control the densification behavior of IBA with temperature is a significant obstacle in the production of aggregates of required properties in large-scale production.

The low calcium silicoaluminous materials ("SAMs") used in embodiments of the invention comprise more refractory minerals, such as silica and alumina, and less fluxing agents, such as calcium, magnesium, potassium, and sodium oxides, than IBA. The IBA used in the Examples, below, comprised about 42% silica ($SiO_2$), 11% alumina ($Al_2O_3$), and 20% calcium oxide (CaO). The natural SAM clays (bentonite and kaolin, for example), shale, and slate comprise from about 48% to 58% silica ($SiO_2$), from about 18% to about 29% aluminum ($Al_2O_3$), and less than about 3% calcium oxide (CaO). Granite sawing residues, which is an example of a mining waste that may be used in embodiments of the present invention, comprises about 65% silica ($SiO_2$), about 15% alumina ($Al_2O_3$), and about 2.6% calcium oxide (CaO). The additional components of these low calcium SAMs are described in the Examples, below. Waste glass comprises about 72% silica ($SiO_2$), about 2% alumina ($Al_2O_3$), and about 9% calcium oxide (CaO). Waste glass also comprises about 12% sodium oxide ($Na_2O$), which is also a fluxing compound. Furnace bottom ash, which has the same composition as pulverized fuel ash from coal combustion ("PFA"), comprises about 52% silica ($SiO_2$), about 26% alumina ($Al_2O_3$), and about 2% calcium oxide (CaO). The other fluxing agents in these low calcium SAMs have similar low concentrations as in IBA.

Mixing IBA with low calcium SAMs in specific proportions changes the chemical composition and mineralogy of the mixture, modifying the rapid sintering behavior of IBA in a predictable manner. This results in a more gradual sintering and broader temperature interval between the initial softening, sintering, and melting of the samples. For example, adding bentonite to IBA reduces the amount of fluxing minerals present in the mixture as compared to a 100% IBA, while increasing the content of refractory minerals such as quartz and kaolinite. Since refractory minerals such as quartz and kaolinite have higher melting points than the fluxing agents, the mixtures sinter and melt at higher temperatures.

As shown in FIG. 1, in an 60%/40% IBA/bentonite mix, for example, in order to produce a sintered lightweight aggregate having a density of from about 1.5 g/cm$^3$ to about 1.8 g/cm$^3$, the sintering temperature may be within a range of about 20° (from about 1,085° C. to about 1,105° C.). In a 40%/60% IBA/bentonite mix, similar densities may be achieved at a temperature within a 50° C. range of from about 1,080° C. to about 1,130° C. In addition, increasing the bentonite concentration to 60% delays sintering as the maximum density is reached at about 1,180° C. (in contrast to 1,100° C. for 100% IBA and 1,130° C. for 60%/40% IBA/bentonite). It is expected that further increases in bentonite to 80% and above would result in lightweight aggregates having densities of from about 1.5 g/cm$^3$ to about 1.8 g/cm$^3$ over a wider temperature range than the 40%/60% IBA/bentonite mix. The broader temperature ranges facilitate production of aggregates of desired density and other properties, despite variations in composition of the IBA. FIG. 1 is based on the results of Example 3, below.

It has also been found that the effects of variations in IBA composition on characteristics of resulting aggregates may be further mitigated by wet milling the IBA. Wet milling has been found to reduce material heterogeneity and produce more homogeneous slurries that are more suitable for further processing, than other commonly used techniques.

In a method in accordance with an embodiment of the invention, an aggregate is formed by mixing predetermined amounts of IBA and a low calcium silicoaluminous material ("SAM"), agglomerating the mixture, and pyroprocessing the agglomerate at a selected temperature. The low calcium SAM has less calcium than the IBA. The temperature may be selected based, at least in part, on the proportion of IBA to the SAM, and the desired density and other properties of the aggregate, such as water absorption and/or strength, based on data such as that graphically represented in FIG. 1. A temperature that will cause sintering is preferred. The IBA may be milled prior to sintering, to provide a fine particle size for distribution. Preferably, the SAM is also milled, except for bentonite and kaolin, which already have a fine particle size distribution. The IBA and the SAM may be milled together. Wet milling is preferred. The mixture is also preferably agglomerated prior to sintering, to create agglomerates having a desired size and shape to form the sintered aggregate 20. Pelletization is a preferred agglomeration method.

Figure 2:
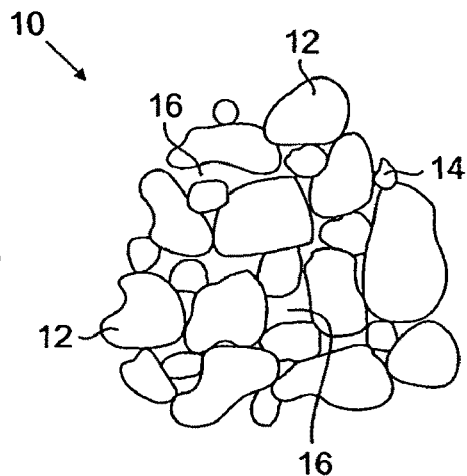
FIG. 2 is a schematic cross-section of an example of an agglomerate produced in accordance with processes of the invention.

FIG. 2 is an example of an agglomerate 10 comprising SAM particles 12, such as waste glass, clay (bentonite, kaolin), shale, slate, granite sawing residue, and FBA, IBA particles 14, and pores 16, which may be pyroprocessed, for example, to form an aggregate in accordance with an embodiment of the present invention. During pyroprocessing, fluxing compounds, such as calcium oxide, sodium oxide, and other compounds with melting points below the processing temperature in the original grain particles of IBA 14 and SAM particles 12, melt and flow into the pores 16, as discussed above. If the SAM particles 12 are waste glass, which is a non-crystalline solid, densification occurs by fusing of softened glass particles by viscous sintering at temperatures which are generally much lower than the melting temperatures of other, crystalline SAM particles, such as granite sawing residue, clay, shale, slate, and furnace bottom ash.

Figure 3:
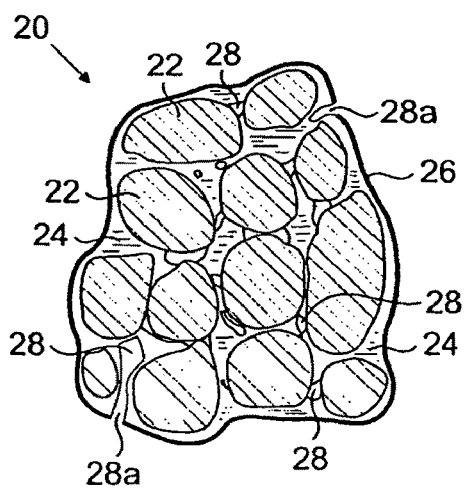
FIG. 3 is a schematic cross-sectional view of an example of a sintered aggregate, in accordance with embodiments of the invention.

FIG. 3 is a schematic cross-sectional view of an example of an aggregate 20 resulting from sintering the agglomerate 10, in accordance with an embodiment of the invention. The aggregate 20 comprises a mixture of IBA and SAM. In this example, the agglomerate 10 is sintered at a temperature of from about 1,060° C. to about 1,220° C., depending on the proportion of IBA to SAM and the desired density and/or other characteristics. The sintered aggregate 20 comprises a plurality of grains 22 bonded to each other through a partly glassy and partly crystallized matrix 24, resulting from the melting and/or the crystallization of the components. The grains 22 may comprise silica, alumina, and other minerals with melting points above the processing temperature. The grains 22 fully or partially crystallize during sintering, providing an additional bond between the grains 22. The aggregate 20 preferably has a dense, continuous, relatively impermeable surface layer 26, resulting from coating of the agglomerates 10 with PFA or other inorganic material, as discussed further below. Internal pores 28, which may be channel-like, and small surface pores 28a, which may be microscopic, are also present. The surface pores may connect with the internal pores, enabling the aggregate 20 to absorb water. The degree of water absorption is indicative of the volume and connectivity of the pores.

Figure 4:
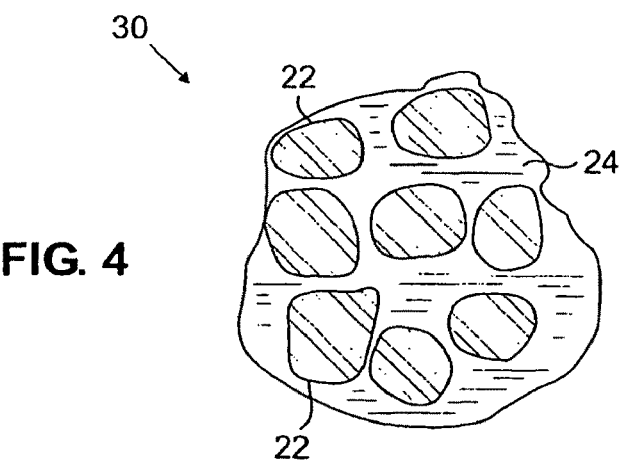
FIG. 4 is a schematic cross-section of an example of a vitrified aggregate, in accordance with embodiments of the invention.

FIG. 4 is a schematic cross-sectional view of an example of a vitrified aggregate 30, in accordance with another embodiment of the invention, which comprises fewer grains 22 and a larger matrix 24. Vitrification results from pyroprocessing of the agglomerate 10 at or above the temperature of maximum densification for the particular proportions of IBA to SAM, where most of the components of the agglomerate melt.

Highly porous lightweight aggregates ("LWAs") having densities as low as about 1.2 g/cm$^3$ and water absorptions above about 40%, with very low strengths, as well as very strong, well-sintered LWAs with densities up to 2.0 g/cm$^3$, may be made in accordance with embodiments of the invention. Normal weight aggregates, with densities greater than 2.0 g/cm$^3$, and up to about 2.6 g/cm$^3$, and water absorptions close to zero, may also be made in accordance with embodiments of the invention. Aggregate production with IBA and SAM in accordance with embodiments of the invention presents an advantageous reuse application.

Where the intended application requires a lower density aggregate (less than about 1.3 g/cm$^3$), with a microstructure of high porosity within a matrix 24, an organic material may be introduced into the IBA/SAM mix. The organic material may be a waste organic material, such as activated carbon waste ("ACW"), or any waste from agricultural, forestry, or industrial sources that has high carbon content. Activated carbon results from the controlled combustion of carbonaceous material, such as wood, coal or peat. It is used as a filter in water treatment to absorb contaminants. Activated carbon waste is the spent activated carbon after it has been used. Starch may also be used. The organic material burns off during firing, increasing the porosity of the resultant aggregates and decreasing their densities. Lightweight aggregates with densities as low as 0.5 g/cm$^3$ may be produced by adding organic waste. Aggregate production with IBA, SAM, and ACW presents a further advantageous reuse application for at least two waste products. If the SAM is also a waste product (waste glass, granite sawing residue, furnace bottom ash), then three waste materials may be reused.

Figure 5:
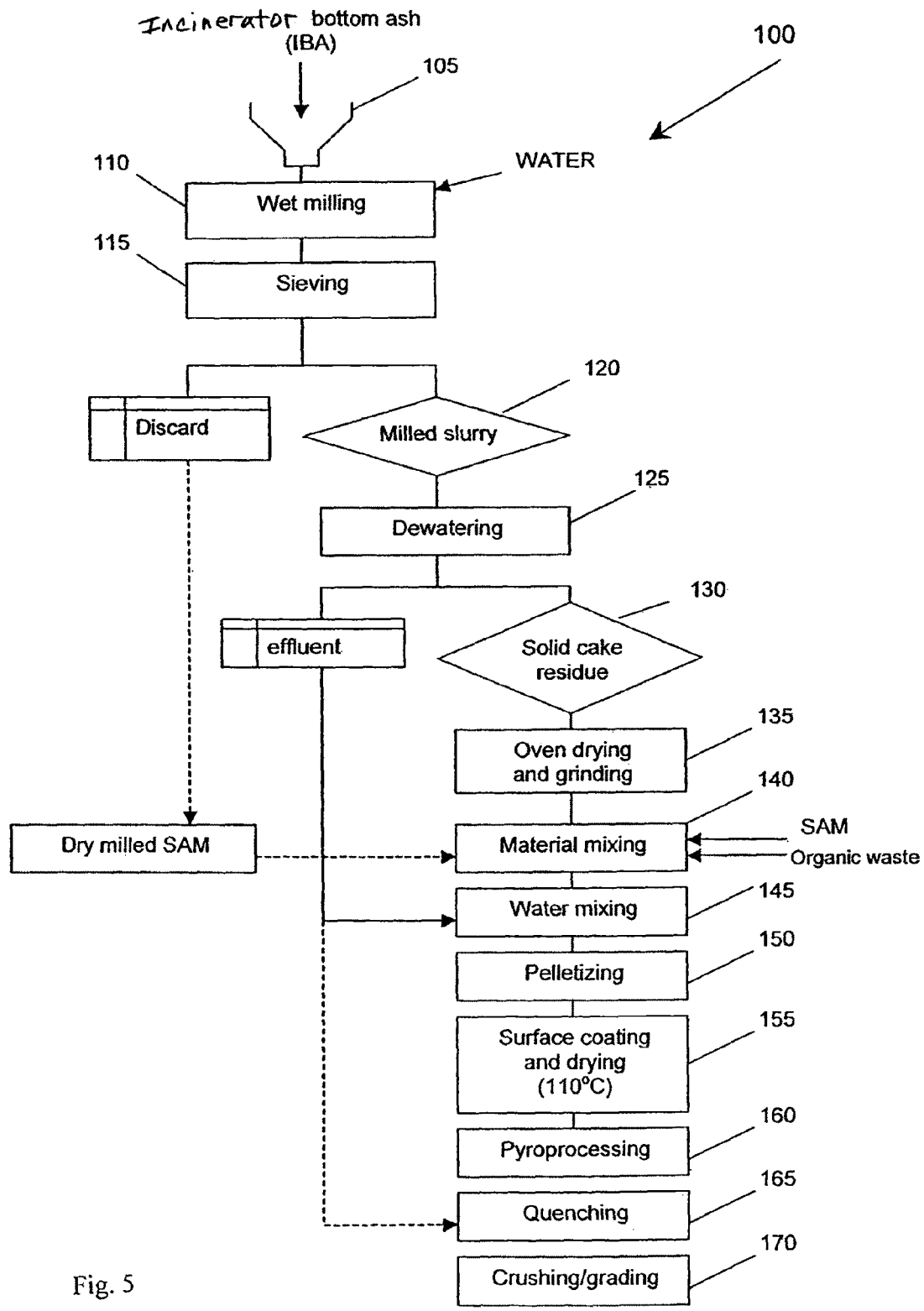
FIG. 5 is an example of a method for producing aggregates, in accordance with an embodiment of the invention.

FIG. 5 is an example of a method 100 of manufacturing aggregates in accordance with an embodiment of the invention. IBA is added to a barrel of a ball mill in Step 105 and is milled with water, in Step 110. Milling is used to reduce the particle size distribution of the IBA to a distribution that is fine, to improve pyroprocessing. Powders with fine particle size distributions have advantageous characteristics because the high surface area to volume ratio increases diffusion of small particles through the liquid phase to the larger particles and because the powders are better distributed throughout the aggregate, with good packing densities. The resulting particles preferably have a mean particle size of about 45 microns and less, for example. Wet milling is preferred because it has been found to provide more uniform particle size distribution. In addition, the liquids used in the wet milling process tend to break up agglomerates and reduce welding of powder particles. Alternatively, the IBA may be dry milled in a hammer mill, for example.

Wet milling may take place in a closed moving cylindrical container, for example, wherein spherical grinding media, such as aluminum spheres, in a liquid medium, such as water or alcohol, apply sufficient force to break particles suspended in the medium. Movement may be imparted to the grinding media by tumbling, vibration, planetary rotation, and/or agitation. The most important variables controlling the powder particle size distribution are the speed of milling (rpm), the milling time, the amount of grinding media, the amount of liquid, and the initial particle size of the raw material. About twice as much liquid (by weight) as IBA (by weight) is preferably provided. The milling media may be aluminum spheres that have a total weight of about four to five times that of the IBA. For efficient results, the container should be at least half filled with the grinding media. Steel spheres may be used instead of aluminum. The spheres preferably have a small diameter, such as from about 0.5 inches (12.7 mm) to about ⅝ inches (15.9 mm). Milling may take place for about 8 hours, for example.

The wet milled IBA is separated to remove large particles through a sieve, for example, in Step 115. The presence of large particles may interfere with the formation of homogenous pellets. Separation may take place in multiple steps. In one example, the IBA may be mechanically shaken in series over ASTM standard stainless steel mesh screens having openings of 3.35 mm, 1.70 mm, 355 microns, and 150 microns. The finer IBA fraction having particle sizes less than 355 microns is further processed.

The finer fraction from Step 120 is dewatered, in Step 125. Preferably, all the free water is removed. The water removed is referred to as effluent, which may be used in the pelletizing Step 150 and/or the quenching Step 165, which are discussed further below, or discarded. It has been found that while sodium and potassium salts leached into the effluent, heavy metals did not. The water is therefore safe to use or discard. It is believed that the heavy metals present in the IBA did not leach because they were bound to low solubility carbonates and/or silicates. Water may be removed in a filter press or other filtration apparatus, for example. Dewatering results in formation of a solid moist cake residue, in Step 130.

The cake is dried and ground, in Step 135. This step converts the cake into a powder. The cake may be dried in an oven at 110° C., for example. The powder may be ground by a mortar and pestle, for example. In large-scale production, the dry solid cake may be ground to a powder in a mixer with blades or a dry hammer mill, for example.

The ground IBA powder is thoroughly mixed with the SAM, in Step 140. If the SAM is already in the form of powder having a suitable particle size distribution, the SAM may be directly mixed with milled IBA in Step 140. If the SAM is waste glass, granite sawing residue, shale, slate, FBA, or has a coarse distribution, it may be dry milled before mixing with milled IBA. Preferably about 95% to 5% SAM by dry weight is added to the IBA. More preferably, from about 70% to about 30% SAM by dry weight is added. More preferably, from about 50% to about 50% SAM by dry weight is added. Most preferably, about 60% SAM is added. Organic material, such as an organic waste, may also be added in Step 140, if desired, to increase porosity in the sintered aggregate 20. Up to about 30% by weight of organic material by dry weight of the IBA/SAM mixture may be added.

Water is added to the mixture to achieve a clay-like consistency, which facilitates agglomeration, which is discussed in Step 145, below. The amount of water to be added is related to the water absorption characteristics of the SAM particles, which is dependent upon the type of SAM, the amount of SAM in the mixture, and the particle size of the SAM. For example, if the SAM is bentonite and the proportion of IBA to SAM is about 60% IBA to 40% SAM, it has been found that the amount of water required is about 27% by weight of the total dry weight of the IBA/clay mixture. If the proportion is 40%/60% IBA/clay, it has been found that about 30% of the total dry weight of the IBA/clay mixture of water should be added. If the proportion is 20%/80% IBA/clay, then the amount of water required is about 32% of the total dry weight of the IBA/clay mixture. The effluent removed from the milled slurry in Step 125 may be used here. Less water is required if the SAM in the mix is waste glass or granite sawing residue, for example, as discussed in the examples, below.

The resulting mixture is agglomerated, in Step 150. Agglomeration is a particle size enlargement technique in which small, fine particles, such as dusts or powders, are gathered into larger masses, such as pellets. Preferably, the mixture is agglomerated by pelletization, wherein fine particles dispersed in either gas or liquid are enlarged by tumbling, without other external compacting forces. A pelletizing rotating drum or disc may be used, for example. The strength of the resulting pellets depends on the properties of the particles, the amount of moisture in the medium, and mechanical process parameters, such as the speed of rotation and angle of tilt of the rotating drum, as is known in the art. An example of the use of a rotating drum is described in the examples, below. The resulting pellets are nearly spherical or slightly angular, and vary in color from light to dark brown depending on the carbon and iron content in the mixes and may range in size from about 3 mm to about 40 mm, for example. As discussed above, FIG. 2 is an example of a pellet 10. Extrusion may also be used instead of pelletization. Extrusion results in a brick-like material that can be crushed into smaller particles after hardening. Alternatively, compaction may be used to produce cylindrical agglomerates, such as tablets or other shapes.

The agglomerated mixture is optionally surface coated and then dried, in Step 155. The pellets may be coated with an inorganic material that will not melt at the pyroprocessing temperature. The inorganic material may comprise low loss on ignition ("LOI") PFA, clay, shale, slate, or granite sawing residues in the form of a dust, for example. Covering the pellet surface with a thin layer of non-sticking material results in formation of a skin on the pellet surface that decreases clustering of the pellets, enhances the pellet strength, and creates a thin dense outer skin 26 on the aggregate 20, as shown in FIG. 3, for example. The amount of inorganic material added may be small. The pellets may be coated by sprinkling the dust on them or rolling the pellets in the dust, for example. Drying may take place at about 110° C. in an oven, for example. Drying is preferably provided because sintering wet pellets in a kiln may result in cracking and exploding of the pellets due to rapid temperature changes.

The coated and dried pellets are pyroprocessed, in Step 160. The pyroprocessing may take place at a temperature of from about 1,000° C. to about 1,300° C., for example, depending on the composition of the mixture and the desired properties of the aggregate, as discussed in more detail, below. The pyroprocessing may be sintering, which takes place at temperature below the temperature of maximum densification, or vitrification, which takes place at and above the temperature of maximum densification. The pyroprocessing preferably takes place in a rotary kiln. Sintering results in increased strength and density of formerly loosely bound particles, through the formation of interparticle bonds, as discussed above. Vitrification results in even higher strengths at the temperature of maximum densification. As vitrification progresses at higher temperatures, however, density and strength decrease due to bloating of the material, as discussed above.

The pyroprocessed pellets may be quenched in water, in Step 165. Quenching cools the pellets, stopping the melting. If quenched, the resulting aggregate 20 will have a more amorphous matrix 24 than when air cooled, which allows recrystallization. It is known in the art that quenching improves the hardness, toughness and wear resistance of the pyroprocessed aggregates. The water may be at room temperature (about 30° C.), for example.

Figure 6:
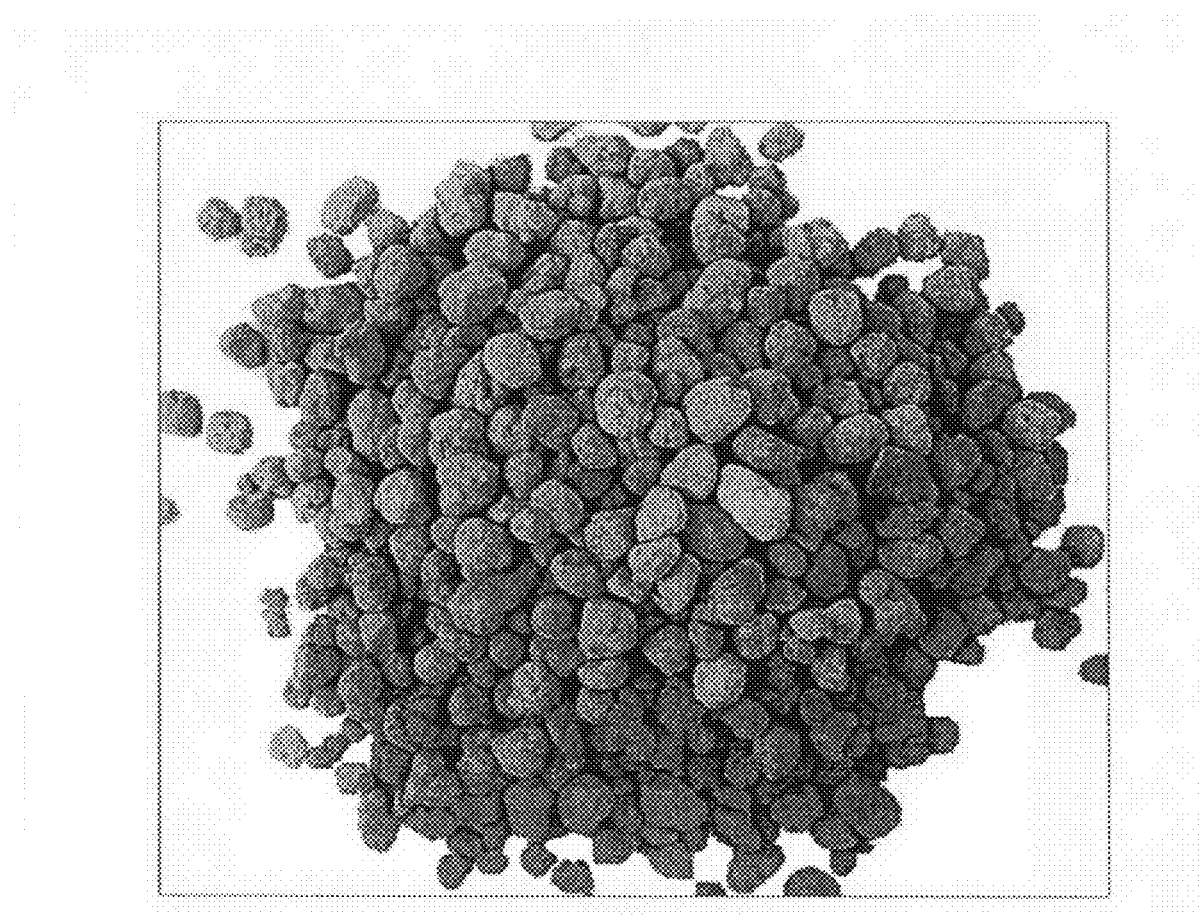
FIG. 6 is a photograph of an example of sintered aggregates, in accordance with embodiments of the invention.

After pyroprocessing and quenching, if provided, the aggregates may be crushed and graded to different sizes, in Step 170. Due to pellet shrinkage during pyroprocessing, if the pellets ranged in size from about 3 mm to about 40 mm, the pyroprocessed aggregates may range in size from about 2 mm to about 30 mm, for example. Appropriate size ranges for the graded aggregates may be about 4 mm to about 8 mm, which may be used in filtration applications, and about 12 mm to about 19 mm, which may be used in concrete. Smaller aggregates (down to about 2 mm) may also be used as fine aggregates in concrete, for example. It is believed that as a result of pyroprocessing, the aggregates are chemically inert against most substances under normal environmental conditions. FIG. 6 is an example of a plurality of sintered aggregates comprising 40% IBA and 60% bentonite, pyroprocessed at about 1,090° C., in accordance with embodiments of the invention.

Figure 7:
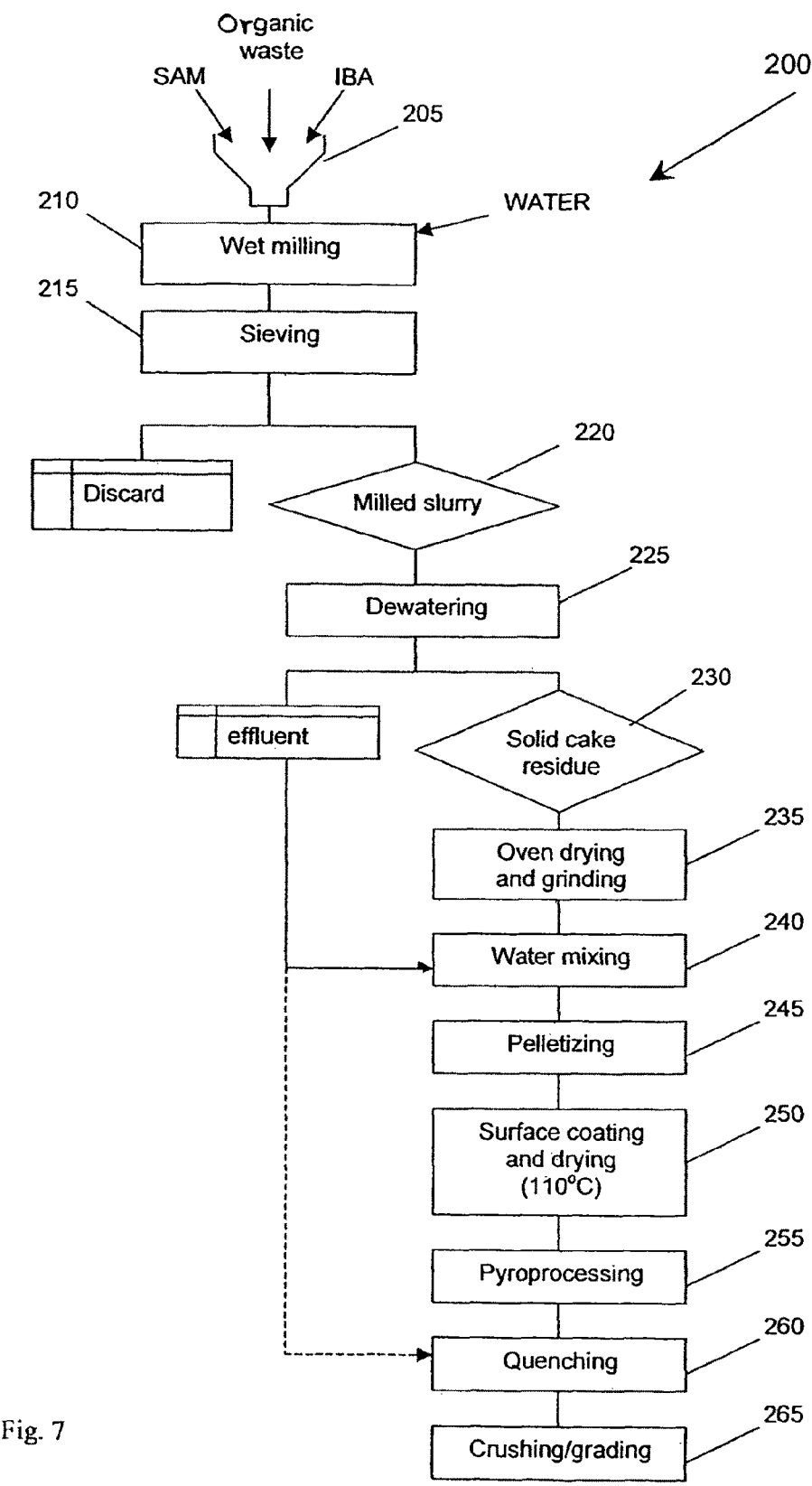
FIG. 7 is an example of another method for producing aggregates, in accordance with another embodiment of the invention.

FIG. 7 is another example of a process 200 for making aggregates in accordance with an embodiment of the invention, in which the SAM and optionally organic material are mixed with the raw IBA, so that both materials are subjected to wet milling together. The milled mixtures therefore have finer particle size distributions than the milled powders produced by the process shown in FIG. 5, where the SAM is introduced to IBA after the IBA has been milled. In Step 205, the IBA, the SAM, and optionally the organic material, are added to a barrel for milling. The materials are wet milled, in Step 210. Steps 215-235 of FIG. 7 correspond to Steps 115-135 of FIG. 5, while Steps 240-265 of FIG. 7 correspond to Steps 145-170 of FIG. 5.

If dry milling is used instead of wet milling in Steps 110 and 210 of FIGS. 5 and 7, respectively, then dewatering is not necessary in Steps 125 and 225, respectively. The IBA powder produced by dry milling may be sieved through a 100 micron sieve and the resulting fraction may be oven dried. The dried fraction may then be processed in accordance with Steps 145-170 of FIG. 5 or Steps 240-265 of FIG. 7.

The following experiments have been performed:

EXAMPLE 1

In this example, pyroprocessed aggregates were made comprising IBA and waste glass ("WG").

Prior to receipt for processing into aggregates, the IBA is typically screened to separate large objects or strand-like materials. Ferrous metals are removed by electromagnets and non-ferrous metals are removed by eddy current separators, for example. The remaining materials are fractionated by size, which may be used for different purposes. The fraction less than about 8 mm was used in these Examples. A larger fraction could also be used, after crushing.

The average chemical analyses (major oxides) of the IBA and WG used in these experiments are shown in Table A, below. The WG in this study is made from soda-lime glass, which accounts for approximately 90 percent of the glass produced in the United States. It consists mainly of silicon, sodium, and calcium oxides with other minor components, such as aluminum and magnesium oxides. The composition of the glass causes the material to densify by liquid phase sintering at lower temperatures than other glasses currently used to produce ceramics, therefore reducing energy production costs. The major crystalline phases in IBA were quartz ($SiO_2$), calcite ($CaCO_3$), and lower amounts of hematite ($Fe_2O_3$), while waste glass is a typical amorphous material.

TABLE A

CHEMICAL ANALYSIS OF IBA & WASTE GLASS

| Constituent | Weight (%) | |
|---|---|---|
| | IBA | Waste glass |
| $SiO_2$ | 41.91 | 71.7 |
| $Al_2O_3$ | 11.09 | 2.1 |
| $Fe_2O_3$ | 5.83 | 0.3 |
| CaO | 19.99 | 9.4 |
| MgO | 1.57 | 2.8 |
| $Na_2O$ | 1.80 | 12.1 |
| $K_2O$ | 1.11 | 0.9 |
| $TiO_2$ | 1.31 | 0.1 |

IBA and WG were processed as described above with respect to FIG. 5 and in more detail, below. In this example, WG was added to wet milled IBA powder before pelletization.

Samples of 1 kg of IBA were wet milled at a water-to-solids ratio of 2 in a 5 liter polypropylene mill rotating at about 50 rpm using high-density alumina milling media for about 8 hours. The mill was a Model No. 21589 from Pascal Engineering Co., Ltd. The grinding media was 4.536 kg of ¾ inch (19.05 mm) high density alumina spheres. The milled slurries were passed through 3.35 mm, 1.70 mm, 355 microns, and 150 micron sieves to remove coarse particles unsuitable for sintering. These coarse particles may include WG that may be ground and then mixed with the wet milled IBA powder.

The particle size distributions of the milled slurries were analyzed using a laser diffraction analyzer. Particle size distribution data indicates a substantial particle size reduction of as-received IBA by wet milling and WG by dry milling. Ninety-five percent of the volume ($d_{95}$ value) of the as-received IBA comprised particles finer than 759 microns. This decreased to a $d_{95}$ of 23 microns after milling. The corresponding $d_{50}$ value for as-received IBA was 30 microns, which was reduced to 6 microns after milling. It has been found that the resulting sintered aggregates had higher density and strength and lower water absorption than aggregates made from mixtures milled for shorter periods of time and therefore having coarser distributions.

The fraction less than 355 microns was de-watered by pressure filtration in a stainless steel extraction vessel using Whatman GF/C filter paper, forming filter cakes. The filter cakes were oven-dried overnight at 110° C. and ground with a mortar and pestle to produce a fine, homogeneous powder.

The WG used was derived in part from bottles and window glass separated from raw IBA. This WG was washed and oven-dried overnight at 110° C. The WG was then crushed in a jaw crusher and separated to reduce the particle sizes between 2 mm to 6 mm and then ground to a ninety five percent of the volume ($d_{95}$) having a particle size less 710 microns in a tungsten carbide Tema mill, available from Gy-Ro, Glen Creston Ltd., Brownfields, England by the use of vibrating rings. It was again milled for additional 4 minutes to further reduce the particle size distribution. This fine WG fraction was used in this Example. The $d_{50}$ value of crushed WG comprised of particles of 197.6 microns, which was reduced to 19.8 microns after 4 minutes of dry milling. In addition, WG from the wet milled slurry of IBA, separated by a 355 micron sieve, was also used. This fraction was also ground in the Tema dry mill for 4 minutes, and combined with the first fraction.

The ground WG was added to the IBA powder produced by wet milling in selected proportions of 100%/0%, 40%/60%, 60%/40% and 0%/100% (IBA/WG). The ground powder mixes of IBA and WG were mixed with water (up to about 35% by total dry weight of the resulting mixture) in a batch mixer and then fed to a rotary drum pelletizer having a 40 cm diameter and a 1 meter length rotating at about 17 rpm at an angle of 30° to the horizontal. The resulting "green" pellets were generally spherical or slightly angular. They had an average of from about 4 mm to about 11.2 mm in diameter. The pellets less than 4 mm were returned to the drum for pelletizing again. The pellets greater than 11.2 mm were broken down into smaller pellets by hand and also returned to the pelletizer.

The pellets were coated with pulverized fuel ash from coal combustion ("PFA") powder by sprinkling the powder onto them. The pellets were then dried at about 110° C. and fed to a rotary kiln having a 77 mm internal diameter by 1,500 mm length, in which the heated zone was 900 mm long. The kiln was set to run at temperatures between 1,060° C. and 1,220° C. for the different IBA/WG mixes. The pellets traveled and were rotated along a tube of the rotary kiln at a speed of about 2.8 rpm for about 10 minutes to about 12 minutes. In this example, the kiln was an electric fired rotary furnace available from Carbolite Hope Valley, England, Model No. GTF R195. The pyroprocessed pellets were discharged from the kiln and were allowed to cool at room temperature. It is noted that the temperature versus density curves (such as that shown in FIG. 1) may vary in each kiln. For example, the curves corresponding to particular proportions of IBA and WG or other SAM may have a temperature of maximum densification slightly lower or higher than those using the specific kiln identified above. The curve shifting may be attributed to a number of factors related to the operational efficiency of the particular kiln, such as the stability of the temperature profile, energy losses, etc. It may therefore be necessary to prepare several samples in a particular kiln being used to identify the temperature range over which aggregates will have desired characteristics.

Results

Tables B-D, below, summarize the physical and mechanical properties of aggregates formed by the process of Example 1. It is noted that the aggregates showed substantial changes in their physical properties with increasing concentrations of WG in the IBA/WG mixes.

Table B, below, summarizes test results for aggregates comprising different proportions of IBA and WG, pyroprocessed over different temperature ranges (10 centigrade degree increments). The data is an average of 7 values for the 100% IBA and an average of 2 values for all WG containing samples. The data is plotted on the graph of FIG. 8. The relative dry density of pyroprocessed aggregates was calculated using Archimedes' method and the water absorption was determined from the increase in weight of "surface dry" samples after being submerged in water for 24 hours.

As discussed above, increasing the amount of WG in the mixes resulted in a broader temperature interval between the initial softening, maximum densification, and complete or near complete melting of the samples, due to the modification of the chemical composition and mineralogy of the IBA with increasing amounts of WG. It was also observed that maximum densification occurred at higher temperatures with increasing WG in IBA mixes, due to the increased concentrations of silica present in the resulting mixture. For example, 100% IBA has a maximum densification temperature of about 1,100° C. A mix of 60% IBA/40% WG has a maximum densification temperature of about 1,120° C., and a 40% IBA/60% WG has a maximum densification temperature of about 1,150° C.

However, it has been found that the incorporation of WG in IBA is not as effective as with other silicoaluminous materials in broadening the temperature range over which samples sinter. For example, while 100% IBA sinters to form a lightweight aggregate of about 1.5 g/cm$^3$ to about 1.8 g/cm$^3$ over a temperature range of from about 1,070° C. to about 1,080° C. (10 centigrade degrees), and 40% IBA/60% WG sinters over a temperature of 1,080° C. to about 1,110° C. (30 centigrade degrees) to form an aggregate in that density range, a 40% IBA/60% bentonite mixture sinters over a 50 centigrade degree range to form a lightweight aggregate, as discussed above. Other SAMs, such as shale, provide similar broadening of the temperature range as bentonite. It is believed that this is due to the presence of high concentrations of sodium and calcium oxides present in the WG, which act as fluxes. It is also believed that the fluxes and the melting glass produce a low viscosity melt, producing a denser, lower porosity product than with the other SAMs.

As is apparent from FIG. 8 and Table B, below, temperature may be used to determine the density and other characteristics of the pyroprocessed product, for a given combination of IBA and WG. For example, in a 40%/60% mix of IBA/WG, sintering at 1,080° C. will yield a LWA with a density of about 1.5 g/cm$^3$. Pyroprocessing the same mixture at 1,150° C. will yield a normal weight aggregate with a density of about 2.6 g/cm$^3$.

Table B also shows the effect of WG addition on the water absorption capacities of the different aggregates. Lightweight aggregates, which are produced at temperatures less than the temperature of maximum densification, typically have some porosity. As maximum densification is approached, the size and number of the pores gradually decrease to zero, as the pores are filled with melted material. Aggregates containing high amounts of IBA exhibit a rapid reduction in water absorption with temperature, while high WG aggregates show a more gradual water absorption reduction with temperature. The 100% WG pellets have substantially less water absorption than all other mixes at all temperatures examined, due to the melted glass filling the pores produced by volatilization.

TABLE B

PHYSICAL PROPERTIES OF IBA/WG AGGREGATES

| Ratio (IBA/WG) | Temperature (° C.) | Density (g/cm$^3$) | Water absorption (%) |
|---|---|---|---|
| 100/0 | 1060 | 1.29 | 41.80 |
|  | 1070 | 1.46 | 33.07 |
|  | 1080 | 1.78 | 21.51 |
|  | 1090 | 2.12 | 3.20 |
|  | 1100 | 2.56 | 1.00 |
|  | 1110 | 2.09 | 0.32 |
|  | 1120 | 1.63 | 0.12 |
| 60/40 | 1060 | 1.43 | 29.88 |
|  | 1070 | 1.52 | 24.45 |
|  | 1080 | 1.59 | 19.13 |
|  | 1090 | 1.66 | 14.34 |
|  | 1100 | 1.85 | 9.23 |
|  | 1110 | 2.22 | 0.80 |
|  | 1120 | 2.64 | 0.02 |

TABLE B-continued

PHYSICAL PROPERTIES OF IBA/WG AGGREGATES

| Ratio (IBA/WG) | Temperature (°C.) | Density (g/cm³) | Water absorption (%) |
|---|---|---|---|
| | 1130 | 2.19 | 0.03 |
| | 1140 | 2.03 | 0.03 |
| | 1150 | 1.92 | 0.01 |
| | 1160 | 1.81 | 0.01 |
| | 1170 | 1.69 | 0.01 |
| | 1180 | 1.55 | 0.03 |
| 40/60 | 1080 | 1.48 | 20.31 |
| | 1100 | 1.64 | 14.23 |
| | 1110 | 1.79 | 10.23 |
| | 1120 | 1.96 | 2.78 |
| | 1130 | 2.22 | 1.56 |
| | 1140 | 2.39 | 0.77 |
| | 1150 | 2.59 | 0.5 |
| | 1160 | 2.32 | 0.1 |
| | 1170 | 2.13 | 0.07 |
| | 1180 | 1.95 | 0.02 |
| | 1190 | 1.69 | 0.01 |
| 0/100 | 1080 | 1.52 | 18.36 |
| | 1100 | 1.68 | 13.98 |
| | 1120 | 1.74 | 9.85 |
| | 1130 | 1.88 | 2.56 |
| | 1140 | 1.99 | 1.84 |
| | 1150 | 2.10 | 0.88 |
| | 1160 | 2.22 | 0.56 |
| | 1180 | 2.48 | 0.08 |
| | 1200 | 2.66 | 0.03 |
| | 1210 | 2.18 | 0.02 |
| | 1220 | 2.08 | 0.04 |

Table C, below, summarizes aggregate crushing values ("ACVs") (%) for selected mixes of IBA and WG, at specific pyroprocessing temperatures. The ACVs are provided at three different temperatures for different proportions of IBA to WG. ACV is inversely proportional to aggregate strength. The selected temperatures were those causing different product characteristics and different microstructures, for comparison. At the lower temperatures in each set, a sintered lightweight aggregate ("LWA") was produced in accordance with a preferred embodiment of the invention. At the middle temperatures, a well-sintered or vitrified, normal weight aggregate with small amounts of residual pores was produced, in accordance with an embodiment of the invention. At the higher temperatures, a vitrified LWA was produced, also in accordance with an embodiment of the invention.

ACVs were lower and the strengths of the aggregates were higher at the temperature of maximum densification (middle temperature). Below that temperature, the densities were lower, the ACVs were higher, and the strengths of individual or bulk aggregates were lower. Above that temperature (middle), the ACVs started to increase as the density and aggregate strength decreased, due to increasing sample melting. The aggregate strengths show the same trend of aggregate densities with increasing temperature, increasing to a maximum value and then decreasing, as expected. The LWAs comprising IBA and WG in varying proportions in accordance with embodiments of the invention also have lower ACVs and higher strengths than LYTAG, which has an ACV of about 34%, as noted below.

TABLE C

AGGREGATE CRUSHING VALUE (%)

| Ratio IBA/Glass | Temper. (°C.) | ACV (%) | Temper. (°C.) | ACV (%) | Temper. (°C.) | ACV (%) |
|---|---|---|---|---|---|---|
| 100/0 | 1080 | 18.7 | 1100 | 9.3 | 1110 | 13.9 |
| 60/40 | 1090 | 16.9 | 1120 | 6.9 | 1170 | 14.3 |
| 40/60 | 1100 | 16.2 | 1150 | 6.6 | 1190 | 12.9 |
| 0/100 | 1100 | 15.2 | 1200 | 5.9 | 1220 | 11.2 |

Figure 8:
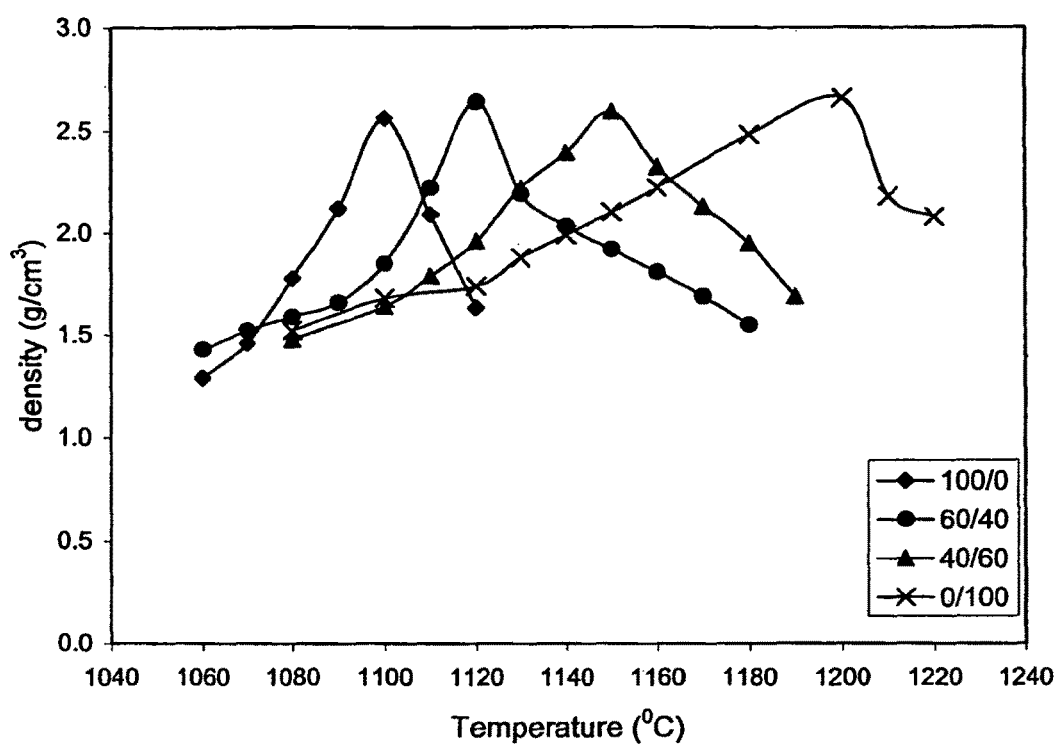
FIG. 8 is a graph of density (g/cm³) versus pyroprocessing temperature (° C.) for IBA and mixtures of IBA and waste glass, in accordance with an embodiment of the invention.

Based on the effect of pyroprocessing temperature and WG addition on the properties of the pyroprocessed aggregates, shown in FIG. 8 and Tables B and C, a 40%/60% IBA/WG mix, sintered at a temperature range of 1,080° C. to 1,190° C., which have densities from about 1.5 g/cm³ to about 2.6 g/cm³, is preferred. Such aggregates may be used in a range of applications, including as aggregates in concrete. The behavior of this mixture during sintering and other pyroprocessing and the final properties of the resulting LWAs may therefore be more easily controlled, than in an aggregate comprising 100% IBA. The reduced water absorption of aggregates of this combination is due to the melted glass, which fills the pores, including the surface pores of the aggregate.

Table D, below, summarizes certain physical properties (relative dry densities and water absorptions from Table B, and bulk densities) and mechanical properties (ACV from Table C) of aggregates comprising 40%/60% IBA/WG at three selected temperatures. The corresponding properties of the commercially available LYTAG (sintered PFA) and OPTIROC (expanded clay) aggregates are also given in Table D. The individual pellet properties are average values of 20 measurements and the bulk pellet properties are averages of 2 measurements.

TABLE D

PHYSICAL AND MECHANICAL PROPERTIES OF IBA/WG AGGREGATES

| Ratio IBA/Glass | Temp. (°C.) | Relative dry density (g/cm³) | Water absorption (%) | Bulk density (g/cm³) | ACV (%) |
|---|---|---|---|---|---|
| 40/60 | 1080 | 1.48 | 20.31 | 0.86 | 17.6 |
| | 1100 | 1.64 | 14.23 | 0.92 | 16.2 |
| | 1150 | 2.59 | 0.5 | 1.76 | 6.6 |
| LYTAG | | 1.48 | 15.5 | 0.85 | 34.2 |
| OPTIROC | | 0.68 | 11.0 | 0.39 | 92.3 |

*Note:
The relative density is specific gravity (OD-oven dry)

A comparison of the properties of LYTAG and the aggregates comprising 40%/60% IBA/WG sintered at 1,080° C. (referred to as LWA-1) or sintered at 1,100° C. (referred to as LWA-2), shows that LWA-1 had comparable relative dry density and bulk aggregate densities (relative density around 1.5 g/cm³, loose bulk density between 0.8 and 0.9 g/cm³). Sintered LWA-2 had slightly higher relative and bulk density than that of LWA-1 and LYTAG. Both sintered aggregates showed significantly lower ACVs than that of LYTAG, indicating that they can resist higher stresses as a bulk when loaded in compression. OPTIROC has very low density, relatively low water absorption, and very low strength. This is to be expected since OPTIROC has a honeycombed microstructure of high volume of isolated spherical porosity.

In order to demonstrate the viability of the LWA-1 and LWA-2 in concrete, a concrete mixture was designed and tested for fresh and hardened concrete. The mix in this example is shown in Table E, which shows the proportions of individual constituents of concrete including LYTAG, OPTIROC, and LWA-1 and LWA-2, based on dry conditions of the aggregates. The mixtures were varied so that LYTAG and LWA-1 and LWA-2 would achieve similar workability as measured by the slump test. The slump was slightly higher for OPTIROC. Since the aggregates were in an air-dry state at the time of casting, the differences in the total water/cement ratios were due to differences in the water absorption of the aggregates. The total water/cement ratio increased for the aggregates with increased water absorption.

TABLE E

CONCRETE MIX RATIOS FOR THE LWA-1 AND LWA-2

| Material | LYTAG | OPTIROC | LWA-1 (1080° C.) | LWA-2 (1100° C.) |
|---|---|---|---|---|
| Cement | 1.0 | 1.0 | 1.0 | 1.0 |
| Sand | 2.11 | 2.05 | 2.11 | 2.11 |
| Coarse aggregate (4-11.2 mm) (ASTM) | 1.35 | 0.45 | 1.22 | 1.44 |
| Total water/ cement ratio | 0.58 | 0.52 | 0.64 | 0.55 |

The desired consistency and subsequent compaction of concrete was readily achieved with all three aggregates. The density of the hardened concrete was measured for all the aggregates and summarized in Table F. The average compressive strengths of hardened concrete made with the commercial and LWA-1 and LWA-2 were determined at the ages of 7, 14 and 28 days and are provided in Table F, below.

TABLE F

PROPERTIES OF FRESH AND HARDENED CONCRETE FROM LYTAG, OPTIROC, LWA-1 AND LWA-2

| Property | LYTAG | OPTIROC | LWA-1 (1080° C.) | LWA-2 (1100° C.) |
|---|---|---|---|---|
| Slump (mm) | 50 | 75 | 50 | 45 |
| Air dry density (g/cm$^3$) | 1.88 | 1.69 | 1.96 | 1.96 |
| 7 day compressive strength (Mpa) | 46.2 | 24.3 | 47.3 | 49.8 |
| 14 day compressive strength (Mpa) | 52.2 | 25.3 | 52.5 | 58.3 |
| 28 day compressive strength (Mpa) | 57.8 | 25.5 | 58.6 | 64.2 |

It is apparent that concrete from the sintered LWA-1 of the invention achieved comparable compressive strengths to the corresponding concrete made from LYTAG. However, researchers have reported significantly lower compressive strengths of concrete made with LYTAG at all ages. (See, for example, U.S. Pat. No. 2003/0047114A1 issued on Mar. 13, 2003 to Kayali, et al.) LWA-2 achieved higher compressive strengths at all ages, due to the higher aggregate densities, strengths and lower water absorptions.

The compressive strength of concrete from sintered LWA-1 at 7, 14 and 28 days was 47.3 MPa, 52.5 MPa and 58.6 MPa, which classifies it as high strength concrete. Comparable compressive strengths were obtained for concrete made with LYTAG. The very low strengths of concrete made with OPTIROC lightweight aggregates are attributed to the very low strengths, low densities, and high porosities of the aggregates. Concrete made with LWA-2 had a compression strength as high as 64.2 MPa at 28 days, which is higher than all the examined aggregates at all ages

EXAMPLE 2

In this example, pyroprocessed aggregates were made comprising IBA and granite sawing residues ("GSR").

The average chemical analyses (major oxides) of the IBA and the GSR used in these experiments are shown in Table G, below. The composition of the IBA used in Example 2 is the same as that used in Example 1. The same equipment used in Example 1 is used here. The IBA was processed prior to receipt, as discussed above.

TABLE G

CHEMICAL ANALYSIS OF IBA & GSR

| | Weight (%) | |
|---|---|---|
| Constituent | IBA | Granite |
| $SiO_2$ | 41.91 | 65.17 |
| $Al_2O_3$ | 11.09 | 14.75 |
| $Fe_2O_3$ | 5.83 | 6.28 |
| CaO | 19.99 | 2.61 |
| MgO | 1.57 | 0.32 |
| $Na_2O$ | 1.80 | 2.02 |
| $K_2O$ | 1.11 | 4.22 |
| $TiO_2$ | 1.31 | 0.15 |

IBA and GSR were subjected to processing described above and shown in FIG. 7. GSR was sieved through a 150 micron sieve and the resulting fraction was used. GSR was added to the IBA so that both materials were subjected to wet milling together.

Samples of 1 kg of IBA and GSR in selected proportions of 100%/0%, 80%/20%, 60%/40% and 40%/60 were wet milled as described in detail in Example 1, above. The milled slurries were sieved and the fraction less than 355 microns was filtered to remove free water. The solid moist cake produced was dried at 110° C. and ground to powder.

The powders were mixed with water (up to 35% by total dry weight of the resulting mixture) in a batch mixer until the consistency of the mix allowed pelletization. The mix was fed to a revolving drum and the pellets collected at the end of the drum were sieved through 4 mm and 12.7 mm sieves. The pellets were coated with PFA (by sprinkling), and were then dried in an oven at about 110° C., overnight. The resulting green pellets were then sintered in a rotary kiln at temperatures between 1,060° C. and 1,240° C., for from about 10 minutes to about 12 minutes.

Results

Tables H-I, below, summarize the physical and mechanical properties of aggregates formed by the process described above.

The relative dry density and water absorption of sintered pellets was determined as described in Example 1. In this Example, compressive strength was calculated by loading individual aggregates to fracture between two parallel plates. Stress analysis has shown that when a sphere is tested in this way on two diametrically opposed points the compressive strength σ of the sphere is given by the equation:

$$IACS = \sigma = \frac{2.8P}{\pi * d^2}$$

where IACS=Individual Aggregate Crushing Strength, d=sphere diameter (mm), and P=fracture load (N). Mean values of the compressive strength were calculated from tests completed on at least 12 aggregates prepared at each temperature. The load is applied by a compression testing device until the aggregate fractures. A dial gauge on the device gives a reading indicative of the load causing fracture. The load may be calculated from the reading by the following equations: Load (lbs)=550.95×(Reading)−1620.7; Load (kg)=Load (lbs)/2.205.

Table H, below, summarizes test results for aggregates comprising different proportions of IBA and GSR pyroprocessed at different temperatures. The data is plotted on the graph of FIG. 9. Table H also summarizes mechanical property results, Individual Aggregate Crushing Strengths ("IACS") for specific mixes of IBA and GSR, at specific temperatures. As above, increasing the GSR concentration in the mixes resulted in a broader temperature interval between the initial softening, maximum densification, and complete or near complete melting of the samples, due to the modification of the chemical composition and mineralogy of the IBA with GSR.

TABLE H

PHYSICAL AND MECHANICAL PROPERTIES OF IBA/GSR AGGREGATES

| Ratio (IBA/granite) | Temperature (° C.) | Density (g/cm$^3$) | Water absorption (%) | IACS (MPa) |
|---|---|---|---|---|
| 100/0 | 1060 | 1.29 | 41.80 | 239 |
|  | 1070 | 1.46 | 33.07 | 322 |
|  | 1080 | 1.78 | 21.51 | 694 |
|  | 1090 | 2.12 | 3.20 | 990 |
|  | 1100 | 2.56 | 1.00 | 1110 |
|  | 1110 | 2.09 | 0.32 | 1055 |
|  | 1120 | 1.63 | 0.12 | 779 |
| 80/20 | 1070 | 1.42 | 32.21 | 298 |
|  | 1080 | 1.49 | 27.35 | 355 |
|  | 1090 | 1.55 | 22.56 | 489 |
|  | 1100 | 1.72 | 18.69 | 712 |
|  | 1110 | 2.09 | 7.39 | 844 |
|  | 1120 | 2.44 | 3.24 | 1102 |
|  | 1130 | 2.22 | 0.78 | 1085 |
|  | 1140 | 2.03 | 0.77 | 1052 |
|  | 1150 | 1.92 | 0.45 | 1001 |
|  | 1160 | 1.86 | 0.30 | 944 |
|  | 1170 | 1.75 | 0.23 | 885 |
|  | 1180 | 1.69 | 0.09 | 832 |
| 60/40 | 1070 | 1.65 | 21.32 | 585 |
|  | 1080 | 1.72 | 19.45 | 612 |
|  | 1090 | 1.89 | 16.49 | 684 |
|  | 1100 | 1.96 | 13.24 | 702 |
|  | 1110 | 2.05 | 8.58 | 788 |
|  | 1120 | 2.19 | 5.34 | 832 |
|  | 1130 | 2.35 | 0.68 | 989 |
|  | 1140 | 2.44 | 0.52 | 1113 |
|  | 1150 | 2.61 | 0.32 | 1200 |
|  | 1160 | 2.44 | 0.22 | 1189 |
|  | 1170 | 2.29 | 0.09 | 1168 |
|  | 1180 | 2.18 | 0.09 | 1154 |
|  | 1190 | 2.10 | 0.05 | 1128 |
|  | 1200 | 2.03 | 0.03 | 1075 |
|  | 1220 | 1.96 | 0.01 | 1021 |
| 40/60 | 1070 | 1.57 | 23.55 | 548 |
|  | 1080 | 1.59 | 20.67 | 634 |
|  | 1090 | 1.65 | 18.34 | 678 |
|  | 1100 | 1.69 | 17.23 | 699 |
|  | 1110 | 1.79 | 15.23 | 723 |
|  | 1120 | 1.88 | 14.89 | 795 |
|  | 1130 | 1.96 | 12.76 | 834 |
|  | 1140 | 2.00 | 7.23 | 902 |
|  | 1150 | 2.06 | 5.23 | 927 |
|  | 1160 | 2.11 | 3.89 | 951 |
|  | 1170 | 2.22 | 2.78 | 1005 |
|  | 1180 | 2.37 | 1.83 | 1111 |
|  | 1190 | 2.49 | 0.67 | 1185 |

TABLE H-continued

PHYSICAL AND MECHANICAL PROPERTIES OF IBA/GSR AGGREGATES

| Ratio (IBA/granite) | Temperature (° C.) | Density (g/cm$^3$) | Water absorption (%) | IACS (MPa) |
|---|---|---|---|---|
|  | 1200 | 2.60 | 0.05 | 1248 |
|  | 1220 | 2.44 | 0.01 | 1195 |
|  | 1230 | 2.29 | 0.02 | 1161 |
|  | 1240 | 2.16 | 0.03 | 1102 |

The water absorptions of aggregates from mixes of high concentrations of IBA decrease rapidly with increasing temperatures, while aggregates from mixes with high amounts of GSR show a more gradual water absorption reduction with temperature. The IACS show similar trends to densities, as expected, increasing to the temperature of maximum densification and decreasing at greater temperatures. The increase in aggregate strength with increasing temperature is rapid for aggregates from 100% IBA mixes and becomes more gradual with increasing amounts of GSR.

Based on the results obtained on the effect of pyroprocessing temperature and GSR addition on the properties of the aggregates, a preferred IBA/GSR mix for aggregates that can be used in a range of applications, including lightweight aggregates in concrete, is the 40%/60% IBA/GSR. Aggregates produced from mixes of IBA containing high amounts of GSR sinter/densify over a wider temperature range than IBA alone, so the behavior during pyroprocessing and the final properties of the aggregates may therefore be more easily controlled. The 40%/60% IBA/GSR mix will sinter to form a LWA with a density less than 2.0 g/cm$^3$ over the temperature range of 1,070° C. to 1,140° C. (70 centigrade degrees). Lightweight aggregates with desired properties and characteristics (porosity, density, strength) may therefore be more readily made.

Figure 9:
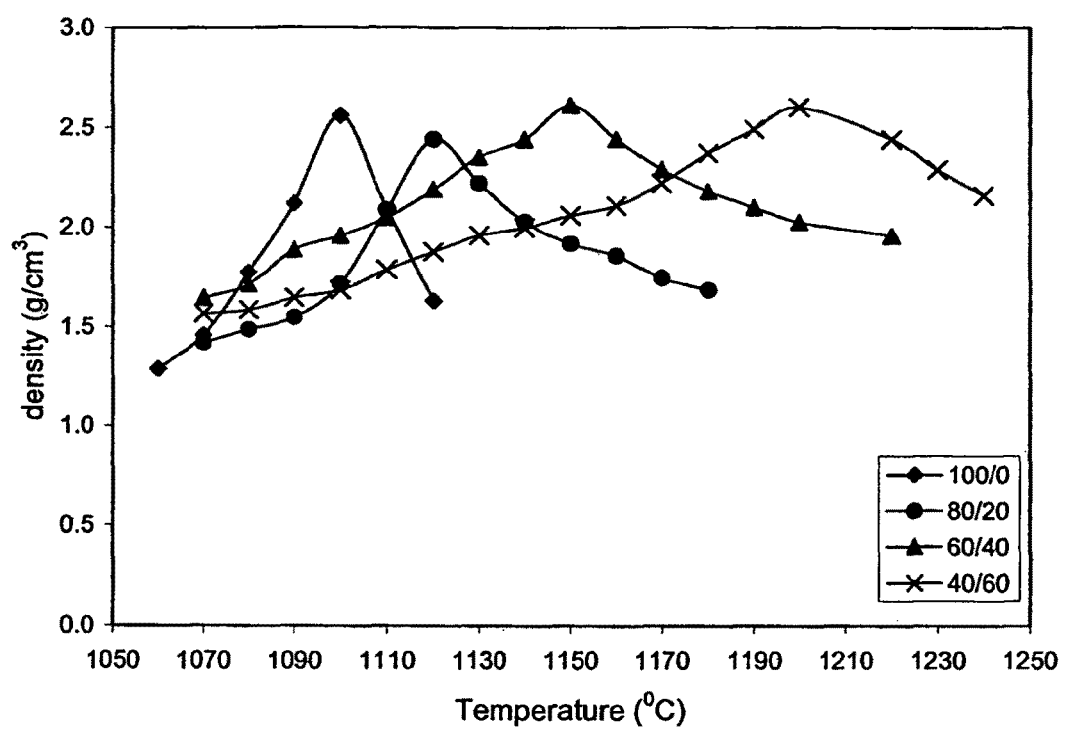
FIG. 9 is a graph of density (g/cm³) versus pyroprocessing temperature (° C.) for IBA and mixtures of IBA and granite sawing residues, in accordance with an embodiment of the invention.

As is apparent from FIG. 9 and Table H, for a given combination of IBA and GSR the pyroprocessing temperature may be used to produce an aggregate with a predetermined density and other characteristics. For example, in a 40%/60% mix of IBA/GSR, pyroprocessing at 1,070° C. will yield a LWA with a density of about from 1.5 g/cm$^3$ to about 1.6 g/cm$^3$, while pyroprocessing at about 1,200° C. will yield a normal weight aggregate with a density of about 2.6 g/cm$^3$.

Table I summarizes the physical (relative dry and bulk densities, water absorptions) and mechanical (IACS) of sintered aggregates from 40%/60% mixes of IBA/GSR at four different temperatures, along with the corresponding properties of the commercially available LYTAG aggregates. The temperatures selected were those causing different product characteristics and different microstructures, for comparison. The lower temperatures produce a porous, low density LWA, in accordance with a preferred embodiment of the invention. The high temperature produces a well-sintered or vitrified, non-porous, dense product.

TABLE I

PHYSICAL AND MECHANICAL PROPERTIES OF IBA/GSR AGGREGATES

| Ratio IBA/GSR | Temp. (° C.) | Relative dry density (g/cm$^3$) | Water absorption (%) | Bulk density (g/cm$^3$) | IACS (MPa) |
|---|---|---|---|---|---|
| 40/60 | 1070 | 1.57 | 23.55 | 0.86 | 548 |
|  | 1100 | 1.69 | 17.23 | 0.89 | 699 |
|  | 1200 | 2.60 | 0.05 | 1.76 | 1248 |
| Lytag |  | 1.48 | 15.5 | 0.85 | 532 |

A comparison of the properties of LYTAG and the aggregates from 40%/60% mix of IBA/GSR pyroprocessed at 1,070° C. (LWA-1) or sintered at 1,100° C. (referred to as LWA-2), shows that LWA-1 had comparable densities and aggregate strengths to LYTAG, although it had higher water absorption. Sintered LWA-2 had higher densities and strengths than that of LWA-1 and LYTAG, although this too had higher water absorption than LYTAG.

EXAMPLE 3

In this example, pyroprocessed aggregates were made comprising IBA and clays.

The average chemical analyses of bentonite and kaolin, shale, and slate used in these experiments are shown in Table J, below. The composition of the IBA used in Example 3 is the same as that used in Examples 1 and 2. The same equipment used in Example 1 is used here.

TABLE J

CHEMICAL ANALYSIS OF CLAYS, SHALE, AND SLATE

| | Weight (%) | | | |
|---|---|---|---|---|
| Constituent | Bentonite | Kaolin | Shale | Slate |
| $SiO_2$ | 51.99 | 48.32 | 54.23 | 58.32 |
| $Al_2O_3$ | 18.42 | 29.44 | 24.85 | 28.54 |
| $Fe_2O_3$ | 1.65 | 2.74 | 5.12 | 7.23 |
| CaO | 1.04 | 2.82 | 0.76 | 1.82 |
| MgO | 4.02 | 2.99 | 0.88 | 3.67 |
| $Na_2O$ | 0.44 | 0.88 | 1.11 | 1.45 |
| $K_2O$ | 0.62 | 0.29 | 2.16 | 0.88 |
| $TiO_2$ | 0.50 | 0.42 | 0.02 | 0.02 |

The bentonite, kaolin, shale, and slate were subjected to processing as described in FIGS. 1, and 10-12, respectively, and in more detail in Example 1.

Samples of 1 kg of IBA were wet milled at water-to-solids ratios of 2 for 8 hours, the milled slurries were sieved and the fraction less than 355 microns was filtered to remove free water. The solid moist cake produced was dried at 110° C. and ground to powder.

Bentonite, kaolin, shale, and slate were each added to the milled powder of IBA in selected proportions of 100%/0%, 80%/20%, 60%/40%, and 40%/60% (IBA/bentonite). The powders were mixed with water (up to 40% by total dry weight of the resulting mixture) in a batch mixer to form a clay-like material mixture for pelletization.

All these additives (clays, shale, and slate) have relatively fine particle size distributions. They can therefore be processed with IBA using both the processing methods shown in FIGS. 5 and 7, where they can be added before or after IBA has been wet milled. The shale and slate used were already ground. If not already ground, they may need to be ground before mixing with the IBA or they may be wet milled with the IBA. The resulting green pellets were in the range of from about 4 mm to about 11.2 mm. The pellets containing bentonite, for example, were coated with bentonite powder and were then dried at 110° C. before being fed to the rotary kiln described in Example 1. The pellets were fired at temperatures between 1,080° C. to 1,220° C. for about 10 to about 12 minutes before being discharged from the kiln and allowed to cool at room temperature.

Results

Tables K-M, below, summarize the physical and mechanical properties of the pyroprocessed aggregates comprising IBA and bentonite, at different pyroprocessing temperatures.

The relative dry density and water absorption of the pyroprocessed aggregates was determined as described in Example 1. The Individual Aggregate Crushing Strengths were determined as described in Example 2. The compressive strength of individual aggregates was also defined as an Aggregate Strength Mass Index ("ASMI") as follows:

$$ASMI = \frac{P}{m},$$

where P=fracture load (kg) and m=mass of pellet (kg).

Mean values of the compressive strength were calculated from tests completed on at least 12 aggregates prepared at each pyroprocessing temperature and proportion.

Table K, below, summarizes test results for aggregates comprising different proportions of IBA and bentonite, pyroprocessed at different temperatures. The data is plotted on the graph of FIG. 1. Table K summarizes physical properties (relative dry densities, water absorptions) and mechanical properties (IACS and ASMI). As discussed above, increasing the clay concentration in the mixes resulted in a broader temperature interval between the initial softening, maximum densification, and melting of the samples, due to the modification of the chemical composition and mineralogy of the IBA.

TABLE K

PHYSICAL PROPERTIES OF IBA/BENTONITE AGGREGATES

| Ratio (IBA/clay) | Temperature (° C.) | Density (g/cm³) | Water absorption (%) | IACS (MPa) | ASMI |
|---|---|---|---|---|---|
| 100/0 | 1060 | 1.29 | 41.80 | 239 | 0.9 |
| | 1070 | 1.46 | 33.07 | 322 | 3.7 |
| | 1080 | 1.78 | 21.51 | 694 | 7.8 |
| | 1090 | 2.12 | 3.20 | 990 | 13.6 |
| | 1100 | 2.56 | 1.00 | 1110 | 16.8 |
| | 1110 | 2.09 | 0.32 | 1055 | 12.5 |
| | 1120 | 1.63 | 0.12 | 779 | 8.2 |
| 80/20 | 1080 | 1.43 | 35.82 | 285 | 4.5 |
| | 1090 | 1.63 | 26.73 | 485 | 6.1 |
| | 1100 | 1.82 | 19.11 | 704 | 8.9 |
| | 1110 | 2.39 | 2.45 | 1066 | 14.5 |
| | 1120 | 1.98 | 0.50 | 1022 | 11.1 |
| | 1130 | 1.75 | 0.46 | 896 | 10.2 |
| | 1140 | 1.53 | 0.39 | 645 | 7.4 |
| 60/40 | 1080 | 1.42 | 30.45 | 335 | 5.1 |
| | 1090 | 1.59 | 27.00 | 396 | 5.9 |
| | 1100 | 1.73 | 21.89 | 597 | 7.2 |
| | 1110 | 1.96 | 9.51 | 740 | 10.1 |
| | 1120 | 2.21 | 5.63 | 844 | 11.9 |
| | 1130 | 2.48 | 1.04 | 1135 | 15.6 |
| | 1140 | 2.31 | 0.84 | 1098 | 12.8 |
| | 1150 | 2.08 | 0.74 | 999 | 11.1 |
| | 1160 | 1.93 | 0.59 | 981 | 10.9 |
| | 1170 | 1.88 | 0.43 | 904 | 10.3 |
| | 1180 | 1.74 | 0.12 | 855 | 9.6 |
| | 1190 | 1.59 | 0.13 | 698 | 8.2 |
| 40/60 | 1080 | 1.52 | 26.79 | 447 | 5.3 |
| | 1090 | 1.57 | 24.54 | 596 | 5.9 |
| | 1100 | 1.63 | 20.53 | 688 | 7.6 |
| | 1110 | 1.71 | 18.34 | 709 | 9.5 |
| | 1120 | 1.79 | 15.35 | 741 | 9.8 |
| | 1130 | 1.86 | 12.39 | 835 | 10.2 |

TABLE K-continued

PHYSICAL PROPERTIES OF IBA/BENTONITE AGGREGATES

| Ratio (IBA/clay) | Temperature (° C.) | Density (g/cm³) | Water absorption (%) | IACS (MPa) | ASMI |
|---|---|---|---|---|---|
| | 1140 | 1.98 | 9.34 | 888 | 12.2 |
| | 1150 | 2.06 | 5.89 | 919 | 13.8 |
| | 1160 | 2.18 | 3.56 | 943 | 15.4 |
| | 1170 | 2.28 | 2.13 | 1051 | 16.2 |
| | 1180 | 2.41 | 0.89 | 1107 | 16.9 |
| | 1190 | 2.28 | 0.02 | 1040 | 14.2 |
| | 1200 | 2.13 | 0.11 | 992 | 12.8 |
| | 1210 | 2.07 | 0.07 | 946 | 12.5 |
| | 1220 | 1.88 | 0.09 | 934 | 11.9 |

The water absorptions of aggregates from mixes of high concentrations of IBA decrease rapidly with increasing temperatures, while aggregates from mixes with high amounts of clay show a more gradual water absorption reduction with temperature. The IACS and ASMI show similar trends to densities, as expected, increasing to the temperature of maximum densification and decreasing at higher air temperatures. The increase in aggregate strength with increasing temperature is rapid for aggregates from 100% IBA mixes and becomes more gradual as the amount of clay in the mixes is increased.

Based on the effect of temperature and clay addition on the properties of the sintered aggregates, shown in FIG. 1 and Table K, a 40%/60% IBA/bentonite mix, sintered at a temperature in a broad range of from about 1,080° C. to about 1,140° C., which have densities from about 1.5 g/cm³ to about 2.0 g/cm³, is preferred. The behaviour of this mixture during sintering and the final properties of the resulting sintered LWAs may therefore be more easily controlled than 100% IBA and other combinations of IBA and bentonite, making it easier to manufacture. Such aggregates may be used in a range of applications including as lightweight aggregates in concrete.

Table L summarizes certain physical properties (relative dry densities, water absorptions, from Table K) and mechanical properties (IACS and ASMI from Table K) of aggregates comprising a 40%/60% mix of IBA/bentonite at three selected temperatures, along with the corresponding properties of LYTAG aggregates, for comparison.

TABLE L

PHYSICAL AND MECHANICAL PROPERTIES OF AGGREGATES

| Ratio IBA/Glass | Temp. (° C.) | Relative dry density (g/cm³) | Water absorption (%) | Bulk density (g/cm³) | IACS (MPa) | ASMI |
|---|---|---|---|---|---|---|
| 40/60 | 1080 | 1.52 | 26.79 | 0.82 | 447 | 5.3 |
| | 1100 | 1.63 | 20.53 | 0.88 | 688 | 7.6 |
| | 1120 | 1.79 | 15.35 | 1.07 | 741 | 9.8 |
| LYTAG | | 1.48 | 15.5 | 0.85 | 532 | 5.7 |

For a given combination of IBA and clay, temperature may be used to produce an aggregate with a predetermined density and other characteristics.

Lightweight aggregates having comparable or superior properties to LYTAG may be produced from this combination, according to the required aggregate properties.

Figure 10:
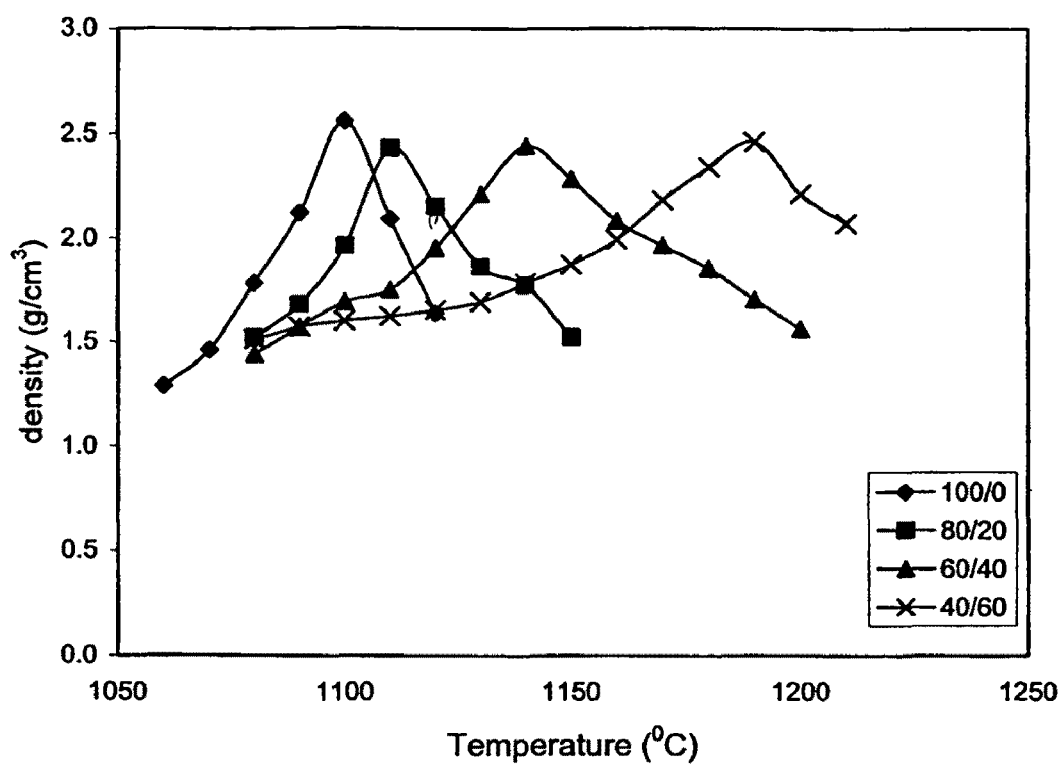
FIG. 10 is a graph of density (g/cm³) versus pyroprocessing temperature (° C.) for MA and mixtures of IBA and kaolin, in accordance with an embodiment of the invention.
Figure 11:
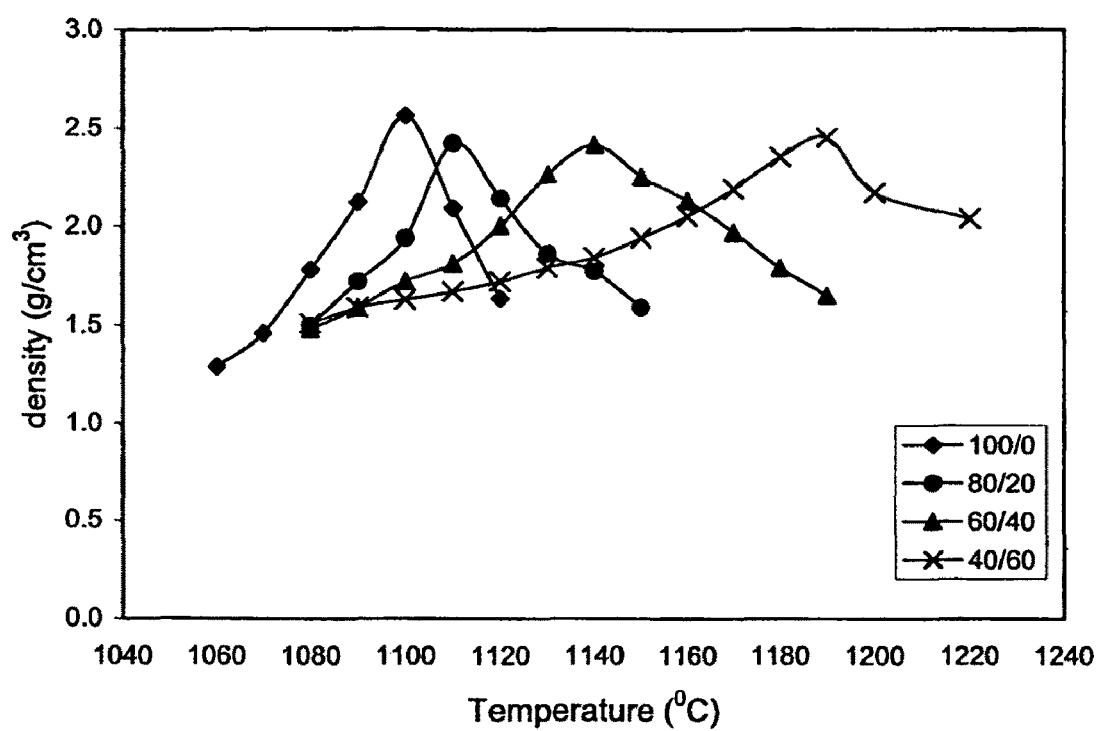
FIG. 11 is a graph of density (g/cm³) versus pyroprocessing temperature (° C.) for IBA and mixtures of IBA and shale, in accordance with an embodiment of the invention.
Figure 12:
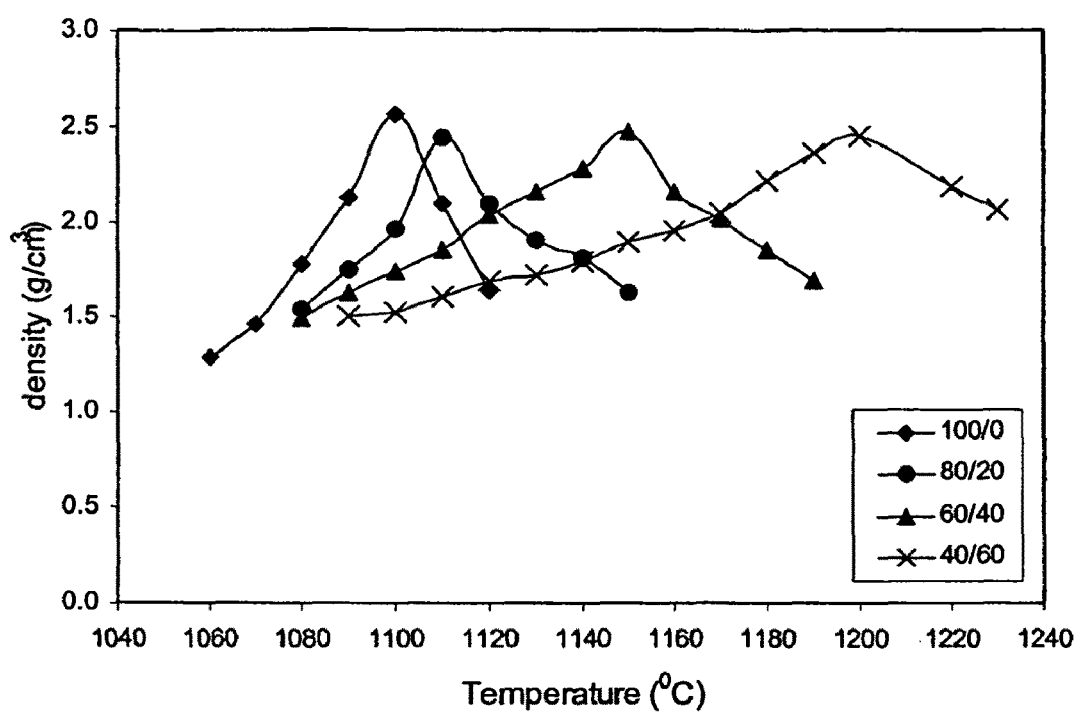
FIG. 12 is a graph of density (g/cm³) versus pyroprocessing temperature (° C.) for IBA and mixtures of IBA and slate, in accordance with an embodiment of the invention.

Table M summarizes the behaviour of aggregates produced from the mixes of IBA with bentonite and the other additives, kaolin, shale, and slate. The temperature ranges over which the aggregates pyroprocess, the corresponding density, water absorption, and ASMI ranges, as well as the temperatures of maximum densification for the different proportions of additive to IBA and the different additive materials, are shown. FIGS. 10-12 show the relation between density (g/cm³) and temperature (° C.) for various proportions of kaolin, shale, and slate. It has been found that both clays bentonite and kaolin, as well as shale and slate, had similar effects on modifying the behavior of IBA with pyroprocessing, due to their low calcium concentrations. However, slightly higher temperatures were observed for the densification of the pellets from the IBA/shale and IBA/slate mixes due to the slightly higher amounts of silica and alumina present in both materials.

TABLE M

CHARACTERISTICS OF IBA/ADDITIVE AGGREGATES

| Additive | Ratio IBA/additive | Temperature range (° C.) | Density range (g/cm³) | Water absorption range (%) | ASMI | Temper. maximum density (° C.) |
|---|---|---|---|---|---|---|
| | 100/0 | 1060-1120 | 1.29-1.63 | 0.1-41.8 | 0.9-16.8 | 1100 |
| Bentonite | 80/20 | 1080-1140 | 1.43-1.53 | 0.4-35.8 | 4.5-14.5 | 1110 |
| | 60/40 | 1080-1190 | 1.42-1.59 | 0.1-30.5 | 5.1-15.6 | 1130 |
| | 40/60 | 1080-1220 | 1.52-1.88 | 0.1-26.8 | 5.3-16.9 | 1180 |
| Kaolin | 80/20 | 1080-1150 | 1.52-1.52 | 0.04-32.5 | 4.9-15.2 | 1110 |
| | 60/40 | 1080-1200 | 1.44-1.56 | 0.03-30.3 | 5.0-15.9 | 1140 |
| | 40/60 | 1080-1210 | 1.51-2.07 | 0.1-27.3 | 5.1-16.4 | 1190 |
| Shale | 80/20 | 1080-1150 | 1.50-1.59 | 0.1-33.6 | 5.4-15.7 | 1110 |
| | 60/40 | 1080-1190 | 1.48-1.65 | 0.1-32.4 | 4.6-15.6 | 1140 |
| | 40/60 | 1080-1220 | 1.51-2.04 | 0.04-27.1 | 5.0-16.8 | 1190 |
| Slate | 80/20 | 1080-1150 | 1.54-1.62 | 0.1-35.2 | 5.3-14.9 | 1110 |
| | 60/40 | 1080-1190 | 1.49-1.68 | 0.04-32.4 | 5.1-15.3 | 1150 |
| | 40/60 | 1080-1230 | 1.50-2.06 | 0.04-29.8 | 5.3-16.8 | 1200 |

Based on these Examples on pyroprocessed mixtures of waste glass, granite sawing residues, clays, such as bentonite and kaolin, shale, and slate, it is believed that furnace bottom ash ("FBA"), which is from the same source as pulverized fuel ash from MSW incinerators ("PFA"), may also be used to form lightweight and normal weight sintered and vitrified aggregates useful in concrete and in other applications. The FBA should be milled, preferably by wet milling with the IBA, to an appropriate particle size. Preferably, 95% by volume of the particles of the milled mix of IBA and FBA is less than about 30 microns. A chemical analysis of PFA is provided in Tables N and O, with an analysis of IBA for comparison. The pyroprocessing of IBA and PFA is discussed in more detail in application Ser. No. 11/238,758, which was filed on Sep. 28, 2005, issued on Apr. 27, 2010 bearing U.S. Pat. No. 7,704,317 and is incorporated by reference herein.

TABLE N

CHEMICAL ANALYSIS OF IBA & PFA

| Constituent | Weight (%) | |
|---|---|---|
| | IBA | PFA |
| $SiO_2$ | 41.91 | 52.32 |
| $Al_2O_3$ | 11.09 | 26.14 |
| $Fe_2O_3$ | 5.83 | 8.61 |
| CaO | 19.99 | 1.87 |
| MgO | 1.57 | 1.62 |
| $Na_2O$ | 1.80 | 1.43 |
| $K_2O$ | 1.11 | 3.77 |
| $P_2O_5$ | 1.23 | 0.28 |
| $TiO_2$ | 1.31 | 1.11 |
| MnO | 0.11 | 0.07 |
| $SO_3$ | 0.49 | 0.58 |
| Moisture | 24 | 0 |
| Loss on Ignition (LOI) | 6.63 | 2.98 |

TABLE O

MINOR AND TRACE CONSTITUENTS IN IBA & PFA

| Constituent | mg/kg | |
|---|---|---|
| | IBA | PFA |
| As | 107 | 179 |
| Ba | 1033 | 1010 |
| Cd | 44 | 5 |
| Cr | 327 | 144 |
| Cu | 717 | 212 |
| Ni | 93 | 143 |
| Pb | 815 | 144 |
| Sr | 297 | 288 |
| Zn | 3000 | 174 |

While in the examples described above, one silicoaluminous material is mixed with the IBA to form aggregates, several of the silicoaluminous materials may be mixed with the IBA to form aggregates, as well.

The embodiments described herein are examples of implementations of the invention. Modifications may be made to these examples without departing from the spirit and scope of the invention, which is defined by the claims, below.

I claim:

1. A method for producing an aggregate, comprising:
    mixing incinerator bottom ash ("IBA") from a municipal solid waste incinerator and a second, non-coal ash silicoaluminous waste material having less calcium than the IBA;
    agglomerating the mixture to form an agglomerate; and
    pyroprocessing the agglomerate to form an aggregate.

2. The method of claim 1, comprising pyroprocessing the agglomerate in a rotary kiln.

3. The method of claim 1 comprising pyroprocessing the agglomerate to form a lightweight aggregate having a dry relative density of less than 2 grams per cubic centimeter.

4. The method of claim 1, comprising pyroprocessing the agglomerate to a temperature in a range from about 1050° C. to about 1240° C.

5. The method of claim 1, wherein the second, waste material comprises mining waste.

6. The method of claim 1, further comprising:
    reducing the particle size of at least the IBA prior to agglomerating.

7. The method of claim 1, comprising:
    pyroprocessing the agglomerate to sinter the agglomerate.

8. The method of claim 1, comprising:
    pyroprocessing the agglomerate to expand the agglomerate to form an aggregate comprising pores.

9. The method of claim 1, further comprising:
    mixing the IBA and the second material with an organic material.

10. The method of claim 1, further comprising:
    controlling one or more selected properties of the aggregate based, at least in part, on a proportion of the IBA to the second, waste material and a pyroprocessing temperature.

11. The method of claim 1, comprising:
    mixing from about 30% to about 70% IBA by dry weight of the mixture with from about 70% to about 30% of the second, waste material by dry weight of the mixture.

12. The method of claim 1, further comprising reducing the particle size of at least the IBA prior to agglomerating.

13. A method for producing an aggregate, comprising:
    preparing a mixture comprising incinerator bottom ash ("IBA") from a municipal solid waste incinerator and a second, non-coal ash silicoaluminous waste material;
    agglomerating the mixture to form an agglomerate; and
    pyroprocessing the agglomerate in a rotary kiln to form a lightweight aggregate having a dry relative density of less than 2 grams per cubic centimeter.

14. The method of claim 13, comprising:
    pyroprocessing the mixture at a temperature in a range of from about 1,000° C. to about 1,300° C.

15. A method for producing an aggregate, comprising:
    mixing incinerator bottom ash ("IBA") from a municipal solid waste incinerator and a second, non-coal ash silicoaluminous waste material;
    agglomerating the mixture to form an agglomerate; and
    pyroprocessing the agglomerate to a temperature to expand the agglomerate to form an aggregate having pores.

16. The method of claim 15, further comprising:
    reducing particle size of at least the IBA prior to agglomerating.

17. The method of claim 15, further comprising:
    mixing the IBA and the second material with an organic material.

18. The method of claim 15, wherein the second material comprises less calcium than the IBA.

19. A method for producing a lightweight aggregate, comprising:
    mixing incinerator bottom ash ("IBA") from a municipal solid waste incinerator with a second, non-coal ash silicoaluminous waste material having less calcium fluxing agents than the IBA;
    agglomerating the mixture in the presence of water to form an agglomerate; and
    pyroprocessing the agglomerate in a rotary kiln to a temperature between 1050° C. and 1240° C. to form a glassy crystalline porous lightweight aggregate having a dry relative density of less than 2 grams per cubic centimeter.

20. The method of claim 19, wherein the second material comprises mining waste.

21. The method of claim 20, wherein the mining waste comprises granite residues.

22. The method of claim 19, wherein the second material comprises waste glass.

23. The method of claim 19, further comprising:
mixing the IBA and the second material with a plastic binder.

24. The method of claim 19, comprising:
pyroprocessing the agglomerate to a temperature to sinter the agglomerate to form a sintered lightweight aggregate.

25. The method of claim 19, comprising:
pyroprocessing the agglomerate to a temperature to cause volatilization and entrapment of volatized gases in the melted liquid phase, thereby expanding the agglomerate to form a lightweight aggregate.

26. The method of claim 19, wherein the second, non-coal ash silicoaluminous waste material has more silica and alumina than the IBA.

* * * * *